US008649887B2

(12) United States Patent
Schulz et al.

(10) Patent No.: US 8,649,887 B2
(45) Date of Patent: Feb. 11, 2014

(54) METHODS, SYSTEMS AND APPARATUS FOR IMPLEMENTING DITHERING IN MOTOR DRIVE SYSTEM FOR CONTROLLING OPERATION OF AN ELECTRIC MACHINE

(75) Inventors: Steven E. Schulz, Torrance, CA (US); Michael J. Grimmer, Troy, MI (US); Konstantin S. Majarov, Torrance, CA (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/477,275

(22) Filed: May 22, 2012

(65) Prior Publication Data

US 2013/0317630 A1 Nov. 28, 2013

(51) Int. Cl.
*G05B 21/02* (2006.01)

(52) U.S. Cl.
USPC ........ 700/73; 318/400.14; 327/127; 290/40 D

(58) Field of Classification Search
USPC ......................................................... 700/73
See application file for complete search history.

(56) References Cited

U.S. PATENT DOCUMENTS

| 5,869,946 | A | 2/1999 | Carobolante | |
|---|---|---|---|---|
| 5,912,552 | A * | 6/1999 | Tateishi | 323/285 |
| 6,147,848 | A * | 11/2000 | Boggs et al. | 361/93.2 |
| 6,301,137 | B1 * | 10/2001 | Li | 363/98 |
| 6,972,534 | B1 | 12/2005 | Schulz et al. | |
| 7,202,651 | B2 * | 4/2007 | Chapuis | 323/283 |
| 7,262,569 | B2 | 8/2007 | Douglas | |
| 7,421,301 | B2 | 9/2008 | Schulz et al. | |
| 7,482,777 | B2 | 1/2009 | Tomigashi | |
| 7,577,545 | B2 | 8/2009 | Hu | |
| 7,830,185 | B2 | 11/2010 | Kim et al. | |
| 7,876,080 | B2 | 1/2011 | Dwarakanath et al. | |
| 2004/0102170 | A1 * | 5/2004 | Jensen et al. | 455/260 |
| 2005/0162138 | A1 * | 7/2005 | Kernahan et al. | 323/234 |
| 2006/0066279 | A1 * | 3/2006 | Brenden et al. | 318/599 |
| 2007/0112443 | A1 * | 5/2007 | Latham et al. | 700/29 |
| 2007/0176659 | A1 | 8/2007 | Gomm | |
| 2008/0298785 | A1 * | 12/2008 | Patel et al. | 388/820 |
| 2009/0190380 | A1 * | 7/2009 | Nangreaves et al. | 363/55 |
| 2011/0068727 | A1 * | 3/2011 | Welchko et al. | 318/490 |
| 2011/0071700 | A1 | 3/2011 | Beck et al. | |

(Continued)

FOREIGN PATENT DOCUMENTS

WO 2009132427 A1 11/2009

OTHER PUBLICATIONS

P.Nagasekhar Reddy, J. Amarnath and P. Linga Reddy, "Space Vector Based Variable Delay Random PWM Algorithm for Direct Torque Control of Induction Motor Drive for Harmonic Reduction" International Journal of Advances in Engineering & Technology, vol. 1, Issue 4, pp. 168-178, Sep. 2011.*

(Continued)

*Primary Examiner* — Kavita Padmanabhan
*Assistant Examiner* — Michael J. Scapin
(74) *Attorney, Agent, or Firm* — Ingrassia Fisher & Lorenz, P.C.

(57) ABSTRACT

Embodiments of the present disclosure relate to methods, systems and apparatus for implementing dithering in motor drive system for controlling operation of a multi-phase electric machine.

19 Claims, 12 Drawing Sheets

(56) References Cited

U.S. PATENT DOCUMENTS

2011/0175454 A1* 7/2011 Williams et al. ............... 307/82
2011/0193509 A1 8/2011 Ooyama et al.
2012/0169263 A1 7/2012 Gallegos-Lopez et al.
2013/0063114 A1 3/2013 Agrawal et al.

OTHER PUBLICATIONS

Huo, Bin, and Andrze M. Trzynadlowski. "Random Pulse Width PWM Modulator for Inverter-fed Induction Motor Based on the TMS320F240 DSP Controller." IEEE transaction on Industrial Electronics 1 (2006).*

Behera, Ranjan K., and Shyama P. Das. "High performance induction motor drive: A dither injection technique." Energy, Automation, and Signal (ICEAS), 2011 International Conference on. IEEE, 2011.*

Fardoun, Abbas A., and Esam H. Ismail. "Reduction of EMI in AC drives through dithering within limited switching frequency range." Power Electronics, IEEE Transactions on 24.3 (2009): 804-811.*

Steven E. Schulz, and Daniel L. Kowalewski, "Implementation of Variable-Delay Random PWM for Automotive Applications" IEEE Trans. on Vehicular Technology, vol. 56, No. 3, pp. 1427-1433, May 2007.*

USPTO, Steven Schulz et al., U.S. Appl. No. 13/477,281, filed May 22, 2012.

USPTO, Notice of Allowance and Fee(s) Due for U.S. Appl. No. 13/477,281, mailed Jul. 9, 2013.

Trzynadlowski, Andrzej M., et al., "A novel random PWM technique with low computational overhead and constant sampling frequency for high-volume, low-cost applications," IEEE Trans. Power Electron., vol. 20, No. 1, pp. 116-122, Jan. 2005.

* cited by examiner

METHODS, SYSTEMS AND APPARATUS FOR IMPLEMENTING DITHERING IN MOTOR DRIVE SYSTEM FOR CONTROLLING OPERATION OF AN ELECTRIC MACHINE

TECHNICAL FIELD

The technical field generally relates to techniques for controlling operation of multi-phase systems, and more particularly relate to methods, systems and apparatus for implementing dithering in motor drive system for controlling operation of a multi-phase electric machine.

BACKGROUND

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain.

Some traditional HEVs implement two three-phase pulse width modulated (PWM) inverter modules and two three-phase AC machines (e.g., AC motors) each being driven by a corresponding one of the three-phase PWM inverter modules that it is coupled to. In some systems, voltage command signals are applied to a pulse width modulation (PWM) module. The PWM module applies PWM waveforms to the phase voltage command signals to control pulse width modulation of the phase voltage command signals and generate switching signals that are provided to the PWM inverter module.

Many modern high performance AC motor drives use the principle of field oriented control (FOC) or "vector" control to control operation of the AC electric motor. In particular, vector control is often used in variable frequency drives to control the torque applied to the shaft (and thus the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have used multi-phase machines in various applications including electric vehicles. As used herein, the term "multi-phase" refers to two or more phases, and can be used to refer to electric machines that have two or more phases. A multi-phase electric machine typically includes a multi-phase PWM inverter module that drives one or more multi-phase AC machine(s). One example of such a multi-phase electric machine is a three-phase AC machine. In a three-phase system, a three-phase PWM inverter module drives one or more three-phase AC machine(s).

In such multi-phase systems, voltage command signals are applied to a pulse width modulation (PWM) module. To control pulse width modulation of the voltage command signals, the PWM module generates PWM waveforms which are equivalent to the incoming voltage command signal in a time averaged sense. The PWM waveforms have a controllable duty cycle with a variable PWM period, and are used to generate switching signals that are provided to the PWM inverter module.

The PWM inverter module uses pulse width modulation (PWM) to generate a variable voltage/frequency output with high efficiency. The PWM voltage waveform is effectively filtered by the motor impedance resulting in a sinusoidal fundamental frequency current going to the motor. However, the PWM inherently results in ripple current generation on the AC output phase currents going to the motor, as well as on the high voltage DC link input. These harmonic currents can in turn create acoustic noise, electromagnetic interference (EMI), bus resonance, or even torque ripple problems. The harmonic currents are typically at the first or second switching frequency carrier group and its sidebands. The harmonic spectrum can have sharp and distinct spikes with large amplitude at the various harmonic frequencies. These large amplitude spikes are often the worst case offenders with respect to the acoustic noise, EMI, bus resonance, and torque ripple.

One conventional method of reducing the amplitude of the distinct harmonics in the current spectrum is to rapidly change the switching frequency of the inverter at a fixed rate. This is known as "dithering." Dithering has been applied to AC inverters as well as many other types of electrical systems where it is desired to spread the spectrum of emissions due to some periodic cycle (such as system clock or PWM).

Notwithstanding these advances, there are many issues that arise when trying to implement dithering techniques in a practical system.

It would be desirable to provide improved methods, systems and apparatus for implementing dithering in motor drive system that is used to control operation of a multi-phase electric machine. It would also be desirable to provide improved methods, systems and apparatus for computing a PWM voltage advance used in controlling operation of an electric machine. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of an electric machine in a motor drive system that includes an inverter module that drives the electric machine.

In accordance with some of the disclosed embodiments, a system is provided that includes a slow-rate task processor module, an intermediate-rate task processor module, and a fast-rate task processor module.

The slow-rate task processor module is configured to iteratively execute slow-rate task processing during a slow-rate task processing loop that executes at a relatively slow-rate during a first task processing period ($T_{TASK2}$). The slow-rate task processor module comprises a first computation module that computes, once during each first task processing period ($T_{TASK2}$), an average switching frequency ($f_{SW\_avg}$) and a dither span frequency ($f_{span}$) that corresponds to an amount of frequency variation allowed when dithering switching frequency ($f_{SW}$).

The intermediate-rate task processor module is configured to iteratively execute intermediate-rate task processing during an intermediate-rate task processing loop that executes at an intermediate-rate during a second task processing period ($T_{TASK1}$). The intermediate-rate task processor module comprises a second computation module and a parameter re-initialization module.

The fast-rate task processor module is configured to iteratively execute fast-rate task processing during a fast-rate task processing loop that executes at a relatively fast-rate during a third task processing period ($T_{Task0}$). The relatively slow-rate is less than the intermediate-rate, and the intermediate-rate is less than the relatively fast-rate. The fast-rate task processing is non-interruptible by the intermediate-rate task processing and the slow-rate task processing. The intermediate-rate task processing is non-interruptible by the slow-rate task processing and is interruptible by the fast-rate task processing. The slow-rate task processing is interruptible by the fast-rate task processing and the intermediate-rate task processing.

The second computation module is configured to compute, at the intermediate-rate ($T_{TASK1}$) during execution of intermediate-rate task processing loop: a pseudo-random number ($K_{rand}$), and a new instantaneous switching frequency ($f_{SW\_new}$) based on the average switching frequency ($f_{SW\_avg}$), the dither span frequency ($f_{span}$) and a scaled version of the pseudo-random number ($K_{rand}$). The parameter re-initialization module regularly and consecutively re-initializes time-dependent parameter values that will be used by the fast-rate task processor, based on the new instantaneous switching frequency ($f_{SW\_new}$).

In some embodiments, the intermediate-rate task processor module further comprises a flag variable control module that is configured to set a flag variable to true after the second computation module computes the new instantaneous switching frequency ($f_{SW\_new}$). The time-dependent parameter values are re-initialized prior to setting the flag variable to true.

In some embodiments, the system also includes a first double-buffer that is configured to hold a first set of parameter values. The first double-buffer includes a first page and a second page. The first page comprises a plurality of first elements and the second page comprises a plurality of second elements. Each one of the first elements is configured to hold one of a first plurality of parameter values, wherein each one of the first plurality of parameter values corresponds a first value for a particular time-dependent parameter, and each one of the second elements is configured to hold one of a second plurality of parameter values, wherein each one of the second plurality of parameter values corresponds to a second value for one of the particular time-dependent parameters. The time-dependent parameters are used by motor control modules, and are a function of switching frequency ($f_{SW}$) and thus sensitive to errors in the switching frequency ($f_{SW}$).

In some embodiments, the fast-rate task processing loop comprises a pre-fast-rate task processor module and a post-fast-rate task processor module. The pre-fast-rate task processor module is configured to execute pre-fast-rate task processing during a pre-fast-rate task processing loop of the fast-rate task processing loop, whereas the post-fast-rate task processor module is configured to execute post-fast-rate task processing during a post-fast-rate task processing loop of the fast-rate task processing loop. The second computation module is configured to compute the pseudo-random number ($K_{rand}$) and the new instantaneous switching frequency ($f_{SW\_new}$) prior to the execution of the pre-fast-rate task processing loop.

The fast-rate task processor module toggles a value of a first index once every second task processing period ($T_{Task1}$) during fast-rate task processing such that a first pointer alternately points to the first page or the second page. The first elements of the first page and the second elements of the second page are configured, depending on the value of the first index at a particular time, to alternately hold either: new parameter values for the time-dependent parameters that are being updated/re-initialized by the parameter re-initialization module for future use by motor control modules based upon the new instantaneous switching frequency ($f_{SW\_new}$) that was computed by the second computation module, or current parameter values for the time-dependent that are consumed/used by the motor control modules at the fast-rate task processor module at a current instant of time. The new parameter values reflect the new instantaneous switching frequency ($f_{SW\_new}$) that will be applied for the fast-rate task processing during a next third task processing period ($T_{Task0}$). The current parameter values reflect the current actual instantaneous switching frequency ($f_{SW}$) that will be applied for the fast-rate task processing during a current third task processing period ($T_{Task0}$).

When the fast-rate task processor module determines that a new intermediate-rate of the second task processing period ($T_{Task1}$) has been initiated, the intermediate-rate task processor module updates the new parameter values for the time-dependent parameters based upon the new instantaneous switching frequency ($f_{SW\_new}$) that was computed by the second computation module. When updating of the new parameter values is complete, the fast-rate task processor module changes the current actual switching frequency to the new instantaneous switching frequency ($f_{SW\_new}$), and then toggles the value of the first index.

Setting the flag variable to true signals the fast-rate task processor that the new instantaneous switching frequency ($f_{SW\_new}$) is ready to be used at the fast-rate task processor during fast-rate task processing. In one embodiment, the pre-fast-rate task processor module comprises a check module that is configured to check the flag variable to determine if the flag variable is set to true, a toggle module that is configured to toggle, when the flag variable is determined to be set to true, the value of the first index to change a first pointer to the double buffer so that the first pointer points to the opposite page that it was previously pointing to, and a module that is configured to generate a frequency change command that goes to hardware to change the current actual switching frequency ($f_{SW}$) to the new instantaneous switching frequency ($f_{SW\_new}$) when the flag variable is determined to be set to true.

In some embodiments, the system can include a second double-buffer that is configured to hold a second set of parameter values different than first plurality of parameter values for the time-dependent parameters. The second double-buffer includes a third page that comprises a plurality of third elements and a fourth page that comprises a plurality of fourth elements. Each one of the third elements is configured to hold one of a third plurality of parameter values, and each one of the fourth elements is configured to hold one of a fourth plurality of parameter values. Each one of the third plurality of parameter values corresponds a first value for a particular parameter, and each one of the fourth plurality of parameter values corresponds to a second value for one of the particular parameters. The fast-rate task processor module toggles a value of a second index at the intermediate-rate during fast-rate task processing such that a second pointer alternately points to the third page or the fourth page once every second task processing period ($T_{Task1}$).

In some embodiments, the post-fast-rate task processor module comprises another check module that is configured to check the flag variable to determine if the flag variable is set to true, an updating module that is configured to update, when the flag variable is determined to be set to true, a variable in software that stores the current actual switching frequency ($f_{SW}$) with the new instantaneous switching frequency ($f_{SW\_new}$), a module that is configured to set the flag variable to false after the current actual switching frequency ($f_{SW}$) is updated with the new instantaneous switching frequency ($f_{SW\_new}$), and a toggle module that is configured to toggle, after the flag variable is set to false, the value of the second index at the intermediate-rate during fast-rate task processing such that the second pointer alternately points to the third page or the fourth page once every second task processing period ($T_{Task1}$).

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

Figure 1:
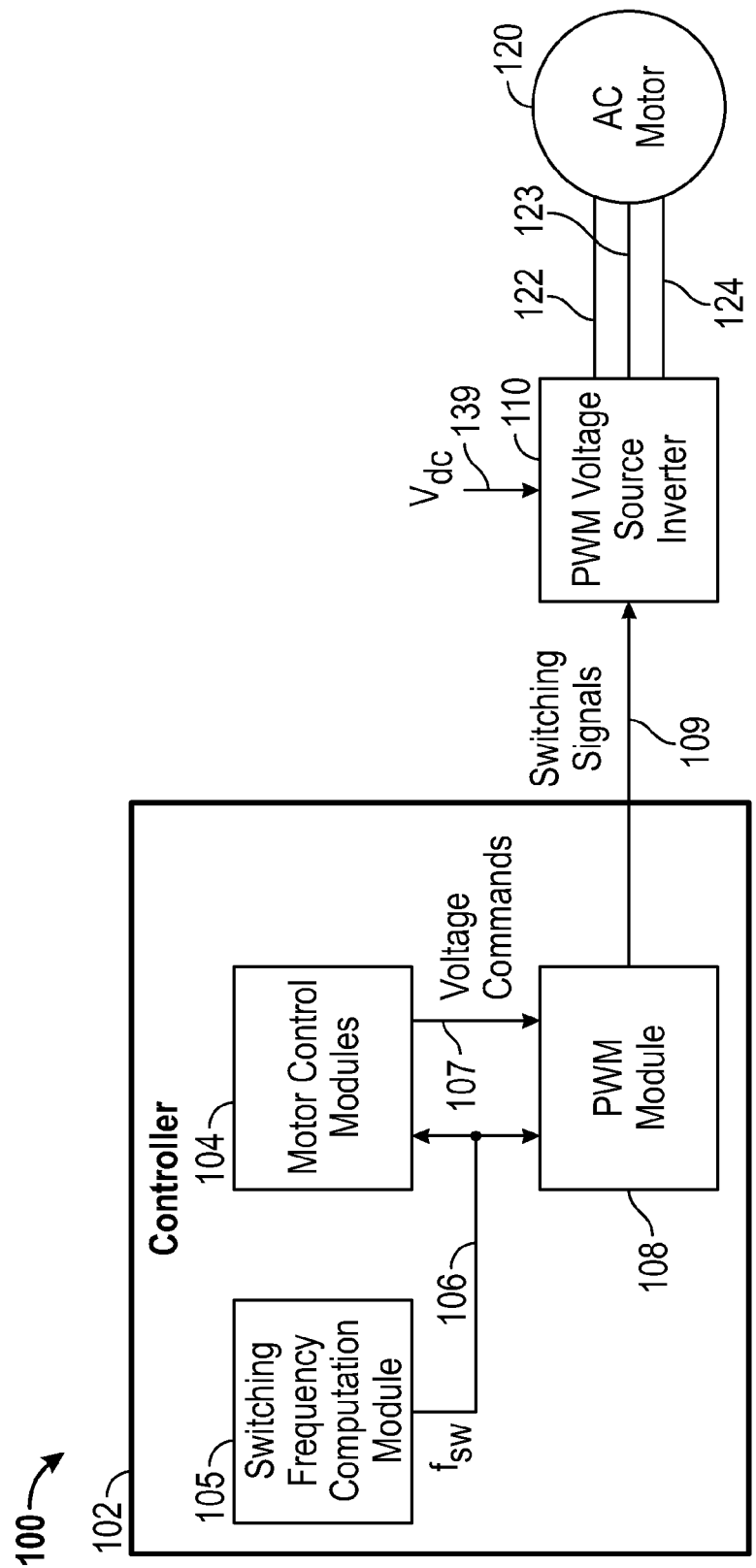
FIG. 1 is a block diagram of one example of a motor drive system in accordance with the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for controlling operation of a multi-phase system. In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system when it is desired to reduce the adverse effect of PWM switching frequency on acoustic noise, EMI, bus resonance, and torque ripple. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a motor drive system 100 in accordance with the disclosed embodiments. The system 100 controls a three-phase AC machine 120 via a three-phase pulse width modulated (PWM) voltage source inverter module 110 coupled to the three-phase AC machine 120 so that the three-phase AC machine 120 can efficiently use a DC input voltage (Vdc) 139 provided to the three-phase PWM voltage source inverter module 110 by adjusting currents 122-124 that control the three-phase AC machine 120. In one exemplary implementation, the motor drive system 100 can be used to control torque in an HEV.

In the following description of one particular non-limiting implementation, the three-phase AC machine 120 is embodied as a three-phase AC powered motor 120; however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM voltage source inverter module 110 via three inverter poles and generates mechanical power (Torque×Speed) based on three-phase sinusoidal current signals 122 . . . 124 received from the three-phase PWM voltage source inverter module 110.

Figure 2:
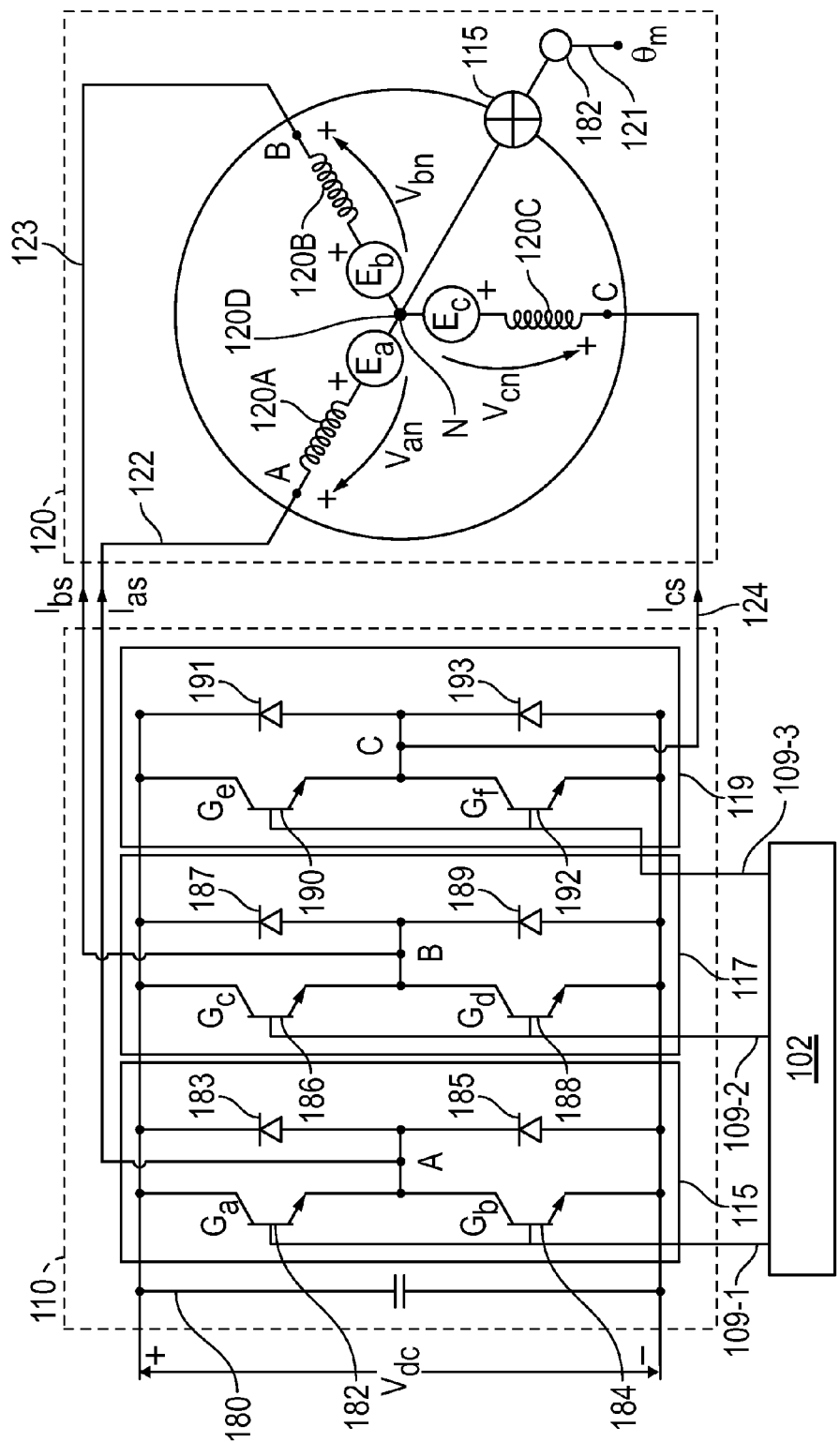
FIG. 2 is a block diagram of a portion of the motor drive system including a three-phase PWM voltage source inverter module connected to a three-phase AC motor.

Prior to describing operation details of the system 100, a more detailed description of one exemplary implementation of the three-phase PWM voltage source inverter module 110 will be provided (including how it is connected to the three-phase AC motor 120) with reference to FIG. 2.

FIG. 2 is a block diagram of a portion of the motor drive system 100 including a three-phase PWM voltage source inverter module 110 connected to a three-phase AC motor 120. It should be noted that the three-phase PWM voltage source inverter module 110 and the three-phase motor 120 in FIG. 1 are not limited to this implementation; rather, FIG. 2 is merely one example of how the three-phase PWM voltage source inverter module 110 and the three-phase motor 120 in FIG. 1 could be implemented in one particular embodiment.

As illustrated in FIG. 2, the three-phase AC motor 120 has three stator or motor windings 120A, 120B, 120C, connected to motor terminals A, B, C, and the three-phase PWM voltage source inverter module 110. The three-phase PWM voltage source inverter module 110 includes a capacitor 180 and three inverter sub-modules 115, 117, 119. In this particular embodiment, in phase A the inverter sub-module 115 is coupled to motor winding 120A, in phase B the inverter sub-module 117 is coupled to motor winding 120B, and in phase C the inverter sub-module 119 is coupled to motor winding 120C. The current into motor winding A 120A flows out motor windings B, C 120B-120C, the current into motor winding B 120B flows out motor windings A and C, 120A, 120C, and the current into motor winding C 120C flows out motor windings A and B, 120A, 120B.

The resultant phase or stator currents (Ias-Ics) 122, 123, 124, flow through respective stator windings 120A-120C. The phase to neutral voltages across each of the stator windings 120A-120C are respectively designated as $V_{an}, V_{bn}, V_{cn}$, with the back electromotive force (EMF) voltages generated in each of the stator windings 120A-120C respectively shown as the voltages $E_a, E_b, E_c$, produced by ideal voltage sources, each respectively shown connected in series with stator windings 120A-120C. As is well known, these back EMF voltages $E_a, E_b, E_c$, are the voltages induced in the respective stator windings 120A-120C by the rotation of the permanent magnet rotor. Although not shown, the motor 120 can be coupled to a drive shaft.

The three-phase PWM voltage source inverter module 110 includes a capacitor 180, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, the three-phase PWM voltage source inverter module 110 has six solid state controllable switching devices 182, 184, 186, 188, 190, 192, and six diodes 183, 185, 187, 189, 191, 193, to appropriately switch compound voltage ($V_{DC}$) and provide three-phase energization of the stator windings 120A, 120B, 120C of the three-phase AC motor 120.

A closed loop motor controller 108 can receive motor command signals and motor operating signals from the motor 120, and generate control signals 109 for controlling the switching of solid state switching devices 182, 184, 186, 188, 190, 192 within the inverter sub-modules 115, 117, 119. By providing appropriate control signals 109-1 . . . 109-3 to the individual inverter sub-modules 115, 117, 119, the closed loop motor controller 102 controls switching of solid state switching devices 182, 184, 186, 188, 190, 192, within the inverter sub-modules 115, 117, 119 and thereby controls the outputs of the inverter sub-modules 115, 117, 119 that are provided to motor windings 120A-120C, respectively. The resultant stator currents (Ias . . . Ics) 122-124 that are generated by the inverter sub-modules 115, 117, 119 of the three-phase PWM voltage source inverter module 110 are provided to motor windings 120A, 120B, 120C. The voltages as $V_{an}$, $V_{bn}$, $V_{cn}$, and the voltage at node N fluctuate over time depending on the open/close states of switches 182, 184, 186, 188, 190, 192 in the inverter sub-modules 115, 117, 119 of the three-phase PWM voltage source inverter module 110, as will be described below.

Referring again to FIG. 1, the motor drive system 100 includes a controller 102. The controller 102 includes motor control modules 104, a switching frequency computation module 105 and a pulse width modulation (PWM) module 108.

In one exemplary implementation, the motor control modules 104 can include modules such as a torque-to-current mapping module, an abc reference frame-to-αβ reference frame transformation module, a stationary-to-synchronous transformation module, a synchronous frame current regulator module, a synchronous-to-stationary transformation module, an αβ reference frame-to-abc reference frame (αβ-to-abc) transformation module, etc. that operate together to generate stationary reference frame voltage command signals (Vas* . . . Vcs*) 107 (also referred to as "phase voltage command signals") that are sent to the PWM module 108. The details of these modules are well-known in the art and for sake of brevity will not be described in detail.

The switching frequency computation module 105 generates a switching frequency ($f_{sw}$) signal 106.

The three-phase PWM voltage source inverter module 110 is coupled to the PWM module 108. The PWM module 108 is used for the control of pulse width modulation (PWM) of the phase voltage command signals (Vas* . . . Vcs*) 107. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying speeds based on the DC input 139.

To do so, the PWM module 108 processes the switching frequency ($f_{sw}$) signal 106 and the stationary reference frame voltage command signals (Vas* . . . Vcs*) 107 to generate switching signals 109 that drive the switching devices 182, 184, 186, 188, 190, 192 of the three-phase PWM voltage source inverter module 110. The switching signals 109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* . . . Vcs*) 107 based on the switching frequency ($f_{sw}$) signal 106 to generate the duty cycle waveforms (not illustrated in FIG. 1) and the switching signals (Sa . . . Sc) 109, which it provides to the three-phase PWM voltage source inverter module 110. The switching signals 109 are PWM waveforms that have a particular duty cycle during each PWM period that is determined by the duty cycle waveforms that are internally generated at the PWM module 108.

The switching signals 109 control the switching states of switches in three-phase PWM voltage source inverter module 110 to generate three-phase voltages at each phase A, B, C. The three-phase PWM voltage source inverter module 110 must be controlled so that at no time are both switches in the same inverter sub-module 115, 117, 119 (FIG. 2) or "leg" are turned on to prevent the DC supply from being shorted. As such, the switches in the same inverter sub-module 115, 117, 119 (FIG. 2) are operated in a complementary manner such that when one is off the other is on and vice versa. To explain further, in a given phase (A . . . C) at any particular time, one of the switches is off and the other one of the switches is on (i.e., the two switches in a particular inverter sub-module must have opposite on/off states). As one example with respect to phase A, when switch 182 is on, switch 184 is off, and vice-versa. As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

The three-phase PWM voltage source inverter module 110 receives the DC input voltage (Vdc) 139 and switching signals 109, and uses them to generate three-phase alternating current (AC) voltage signal waveforms at inverter poles that drive the three-phase AC machine 120 at varying speeds (wr). The three-phase machine 120 receives the three-phase voltage signals generated by the three-phase PWM voltage source inverter module 110 and generates a motor output at the commanded torque (Te*). Although not illustrated in FIG. 1, the system 100 may also include a gear coupled to and driven by a shaft of the three-phase AC machine 120.

Discrete Time Control and Different Processing Rates

Most PWM voltage source inverter modules are implemented as discrete time control systems. In high performance applications, there is a closed loop current control, such as field oriented control or vector control. The motor control algorithms are written in software, and are executed at specific rates.

For example, some tasks or functions, such as current regulation control and PWM generation, can be executed or performed in a loop that executes at a relatively fast rate (e.g., a loop that executes in the range of 1 kilohertz to 20 kilohertz for some systems). The relatively fast rate at which this loop executes can often be synchronous to the PWM frequency, or possibly at a sub-harmonic of the PWM frequency in some applications.

Other tasks or functions, such as torque command processing and current command determination, can be executed or performed in a loop that executes at an intermediate rate (e.g., a loop that executes every 2 milliseconds for some systems) that is slower than the relatively fast rate.

Still other tasks or functions, such as computations of average inverter frequency or other slow changing parameters, can be executed or performed in a loop that executes at a slow rate (e.g., a loop that executes every 10 milliseconds for some systems) that is slower than the intermediate rate.

Many of the motor control algorithms need to know the inverter switching frequency/period (or PWM rate or sample rate) in order to perform certain calculations correctly. Some examples might be discrete time filter coefficients, PI regulator gains, delay compensations, inverter dead-time compensation, etc.

In conventional systems, the inverter frequency changes slowly as a function of the drive system operating conditions (e.g., input DC voltage, motor speed, load torque, inverter temperature, etc.). Good system performance is possible without any special precautions or algorithms.

Dithering

As noted above, dithering is one conventional method of reducing the amplitude of the distinct harmonics in the current spectrum by rapidly change the switching frequency of the inverter at a fixed rate. Dithering has been applied to AC inverters as well as many other types of electrical systems where it is desired to spread the spectrum of emissions due to some periodic cycle (such as system clock or PWM).

For a given operating condition of the motor drive system (e.g., input DC voltage, motor speed, load torque, and inverter temperature) the inverter will be operating a pre-determined average switching frequency. This average frequency may be selected based upon several criteria such as controllability, acoustic noise, efficiency, etc.

When dithering is employed, the frequency is periodically adjusted within a certain band around the average value. Equation (1) shows the instantaneous inverter switching frequency including the dither:

$$f_{sw} = f_{sw\_avg} + K_{rand} \cdot f_{span} \quad (1)$$

where $f_{sw}$ is the instantaneous switching frequency in Hz, $f_{sw\_avg}$ is the time average switching period in Hz, $f_{span}$ is the total peak-to-peak variation in switching frequency due to dither in Hz, and $K_{rand}$ is pseudo random number, in range of $-0.5 \to +0.5$. A pseudo random number generator is used to compute $K_{rand}$, which can vary from $-0.5$ to $+0.5$. This number is updated at the dither rate ($f_{rate}$). Hence, the instantaneous switching frequency will jump to a new random value every $f_{rate}$. The key parameters which determine the performance of the dithering with respect to spreading the spectrum are the dither span and dither rate ($f_{span}$ and $f_{rate}$, respectively). Increasing the dither span spreads each harmonic over a wider frequency range. Increasing the dither rate makes the frequency adjustments more rapid, thus reducing the time the inverter will operate at any given instantaneous frequency. A typical dither rate may be 2-10 milliseconds, while the dither span may be in the range of 10% peak-to-peak of the average switching frequency. The exact values will vary depending upon application.

Drawbacks of Conventional Dithering

When dithering techniques are applied to an AC motor drive system, the switching frequency changes at much faster rate and by a significant amount. This can result in mismatch between the actual switching frequency, and the switching frequency used to compute the parameter values (filter coefficients, regulator gains, delay compensations, etc.) being used in control algorithms.

As such, performance of control algorithms can degrade unless special modifications to the algorithms are adopted. For example, in current regulated systems, motor drive currents can oscillate. The current oscillation can cause unwanted torque oscillation, acoustic noise, or even instability (e.g., loss of current control and over-current shutdown). These degradations are unacceptable, and should be addressed before dithering is employed.

Some of the disclosed embodiments provide methods, systems and apparatus for implementing dithering in motor drive system that make control of a multi-phase electric machine robust to frequent and significant changes in switching frequency due to dithering.

Figure 3A:
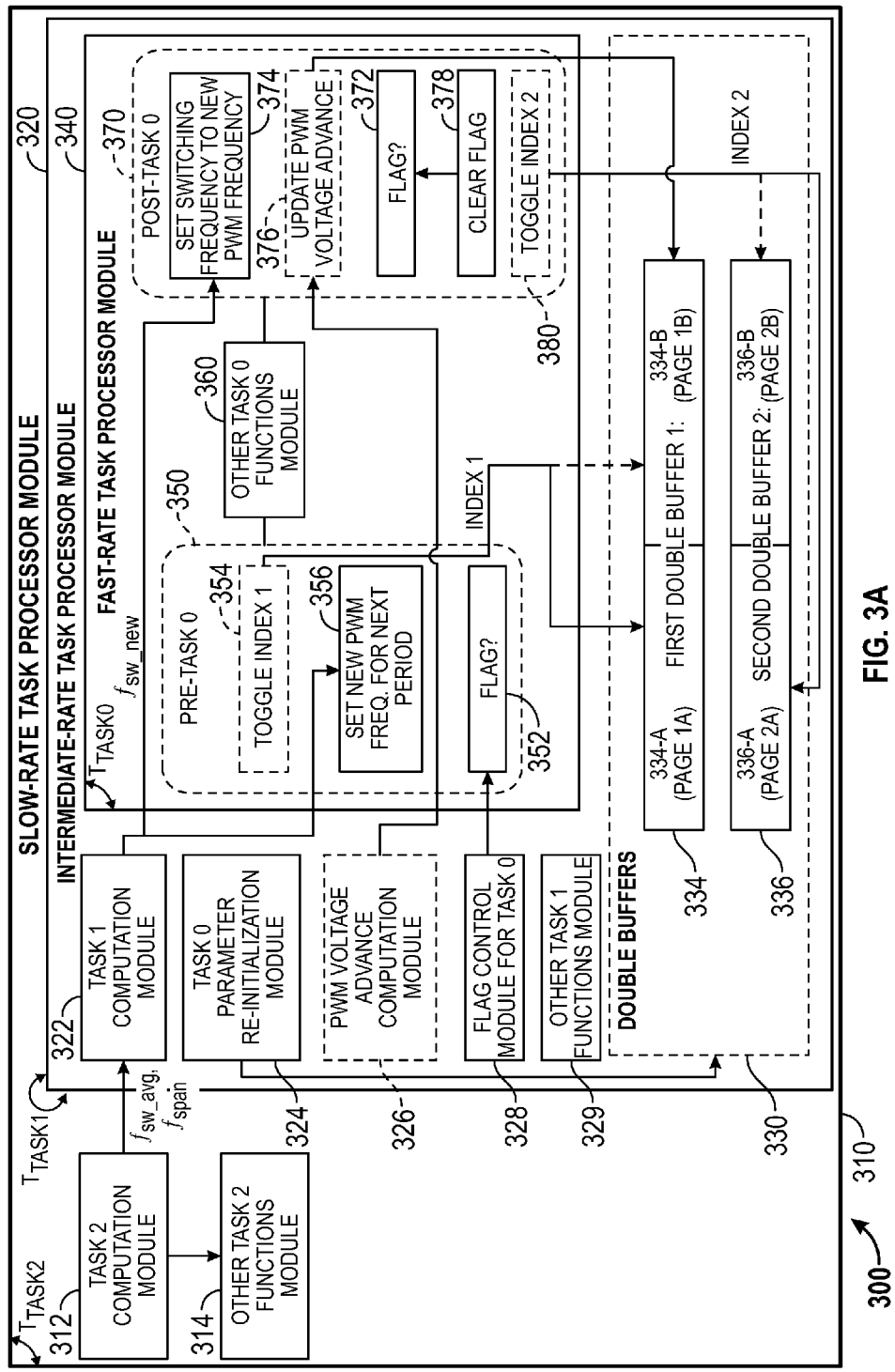
FIG. 3A is a block diagram of a system for dithering switching frequency ($f_{SW}$) that is used to generate switching signals that are applied to three-phase PWM voltage source inverter module in accordance with some of the disclosed embodiments.
Figure 3B:
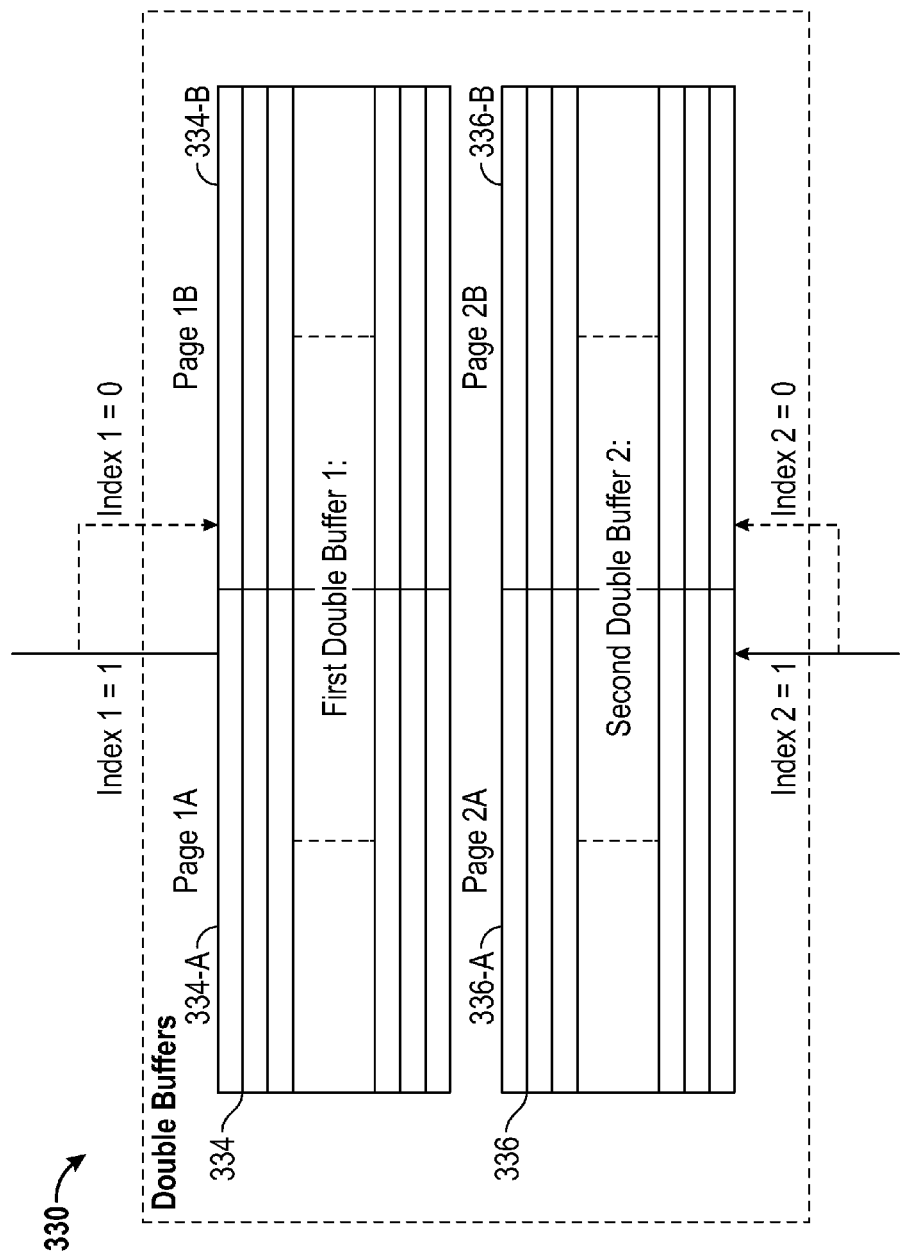
FIG. 3B is a conceptual block diagram of an example of a first double-buffer and a second double-buffer of FIG. 3A.

FIG. 3A is a block diagram of a system 300 for dithering switching frequency ($f_{SW}$) that is used to generate switching signals 109 that are applied to three-phase PWM voltage source inverter module 110 in accordance with some of the disclosed embodiments. FIG. 3B is a conceptual block diagram of an example of a first double-buffer and a second double-buffer of FIG. 3A. The system 300 of FIG. 3A includes a slow-rate task processor module 310, an intermediate-rate task processor module 320, and a fast-rate task processor module 340.

The slow-rate task processor module 310 iteratively performs or executes slow-rate task processing functions at a relatively slow rate ($T_{TASK2}$) or frequency (e.g., in one exemplary implementation, once approximately every 10 milliseconds).

The intermediate-rate task processor module 320 iteratively performs or executes intermediate-rate task processing functions at an intermediate rate ($T_{TASK1}$) or frequency (e.g., once approximately every 2 milliseconds in one exemplary implementation).

The fast-rate task processor module 340 iteratively performs or executes fast-rate task processing functions at a fast rate ($T_{TASK0}$) or frequency (e.g., once every approximately every 0.1 milliseconds or 100 μsec) in one exemplary implementation). In some embodiments, the fast-rate task processor module 340 performs or executes the fast-rate task processing at the PWM rate or switching frequency ($f_{SW}$), which can be in the range of 1 kHz to 20 kHz in some systems. In other systems the PWM rate is a higher multiple of the fast-rate task processing or sample rate.

The fast-rate task processing is non-interruptible. The fast-rate task processing can interrupt both the intermediate-rate task processing and the slow-rate task processing. The intermediate-rate task processing can interrupt the slow-rate task processing.

The slow-rate task processor module 310 includes a computation module 312 that computes an average switching frequency ($f_{SW\_avg}$) and a dither span frequency ($f_{span}$) (or amount of frequency variation allowed). In addition, module 314 can perform or compute other slow-rate functions, such as, temperature measurement, filtering of slowly changing signals, etc.

The intermediate-rate task processor module 320 includes a computation module 322 that performs intermediate-rate task computations, a parameter re-initialization module 324 that re-initializes parameter values that will be used by the fast-rate task processor 340, an optional PWM voltage advance computation module 326 that computes tri-state values for a PWM voltage advance, a flag variable control module 328 that can set a flag variable to pass to the fast-rate task processor 340, and a module 329 that can perform or compute other intermediate-rate functions, such as, torque command processing, current command generation, field weakening, system moding, etc.

The computation module 322 receives the average switching frequency ($f_{SW\_avg}$) and the dither span frequency ($f_{span}$) computed by the slow-rate task processor module 310. The computation module 322 computes a pseudo-random number ($K_{rand}$) and scales or normalizes it to fall within a range of $-0.5$ to $+0.5$. The computation module 322 uses the average switching frequency ($f_{SW\_avg}$), the dither span frequency ($f_{span}$ and the scaled pseudo-random random number ($K_{rand}$) to compute an instantaneous switching frequency ($f_{SW\_new}$) that is updated at the fairly rapid intermediate rate, which can be the same as a dither rate ($f_{rate}$). In one embodiment, the computation module 322 computes the new instantaneous switching frequency ($f_{SW\_new}$) per equation (1) above.

Parameter Re-initialization Module

Some types of parameters used in the motor control calculations are a function of the switching frequency ($f_{SW}$) or sample rate (i.e., the fast-rate task processing period). The fast-rate task processor 340 operates at a much higher frequency than the intermediate-rate task processor module 320. As such, there is the possibility that the intermediate-rate task processor module 320 and the intermediate-rate task processing may be interrupted many times by the fast-rate task processor 340, and therefore the intermediate-rate task processor module 320 can be interrupted during the middle of parameter re-initialization calculations. Hence, it is possible that none, some, or all of the time dependent parameters used during fast-rate task processing 600 will not have been updated with correct values representative of the actual switching frequency ($f_{SW}$), which can result in incorrect control. As such, when the switching frequency ($f_{SW}$) is changing dynamically during operation, these parameters need to be updated to reflect the actual switching frequency ($f_{SW}$).

To accomplish this, the parameter re-initialization module 324 regularly re-initializes all time dependent parameter values that will be used during the fast-rate task processor 340 using the new instantaneous switching frequency ($f_{SW\_new}$) that was computed by the computation module 322. In one embodiment, the parameter re-initialization module 324 regularly and consecutively re-initializes all time dependent parameter values prior to setting a flag variable (at 328) to change over to the new switching frequency ($f_{SW}$) (as opposed to performing the re-initializations at different times). In other words, the software modules executing parameter re-initializations are grouped tightly together and not dispersed throughout the intermediate-rate task computations. This helps reduce the chance that time dependent parameter values (that will be used during fast-rate task processing) will not have been updated with correct values representative of the actual switching frequency ($f_{SW}$).

Double-Buffers and Double-Buffering of Sensitive or Critical Parameters

By contrast, some critical time dependent parameters are more sensitive to errors in the switching frequency ($f_{SW}$), and require additional processing to ensure correct alignment of the parameter value with the actual switching frequency ($f_{SW}$). Some examples of parameters that are sensitive to errors in the switching frequency ($f_{SW}$) would include those related to duty cycle clamping, dead-time compensation, etc.

For these sensitive or critical time dependent parameters, a double buffer 330 can be used to avoid parameter value errors. In this double buffer approach, a parameter value for each sensitive parameter is represented by an array of two values. It is noted that the double buffers 330 are optional and do not need to be implemented in all embodiments.

The double-buffers 330 include a first double-buffer 334 and a second double-buffer 336. The first double-buffer 334 holds a first set of parameter values, and the second double-buffer 336 holds a second set of parameters. For example, in one implementation, at a particular instant, the first double-buffer 334 holds parameter values for parameters that have values that should reflect the next/upcoming fast-rate task processing period ($T_{Task0}$), whereas the second double-buffer 336 holds parameter values for parameters that have values that should reflect the current/existing fast-rate task processing period ($T_{Task0}$).

In one embodiment, the first double-buffer 334 and the second double-buffer 336 each have two pages (in this example, first page 334-A/second page 334-B, and third page 336-A/fourth page 336-B). For example, the first double-buffer 334 has two pages that will be referred to below as a first page 334-A, and a second page 334-B. Each page includes a number of elements. Each element is used to store a parameter value for a particular sensitive parameter. FIG. 3B illustrates the first double-buffer 334 as having two pages 334-A, 334-B that are each represented as a column for sake of illustration and illustrates the second double-buffer 336 as having two other pages 336-A, 336-B that are each represented as a column for sake of illustration. Each page 334-A, 334-B (or column) of the first double-buffer 334 includes a number of elements that are represented as rows within that page or column. Each row corresponds to an element that is used to store a parameter value for a particular sensitive parameter. For example, the first row may store a specific filter gain coefficient, the second row may store a duty cycle limit, and so on. Likewise, the second double-buffer 336 includes two pages 336-A, 336-B that are represented as a column. Each page 336-A, 336-B (or column) includes a number of elements that are represented as rows within that page or column. Each row corresponds to an element that is used to store a parameter value for a particular sensitive parameter.

The first double-buffer 334 and the second double-buffer 336 operate in a similar manner, but for sake of brevity, only a description of the operation of the first double-buffer 334 will be provided below with reference to FIG. 3C.

At any instant in time, the motor control algorithms (e.g., motor control modules 104 and PWM modules 108) will utilize the contents of one of the pages 334-A, 334-B (for example, first page 334-A). Meanwhile, the intermediate-rate task processor module 320 can update the alternate buffer page (for example, second page 334-B) based upon an upcoming switching frequency. At any given time, parameter values of one page are consumed by the control algorithms (for example, calculations in block 360), while the parameter values of the other page are being updated for future use. The index 1 alternates which page it is pointing to once every intermediate-rate task processing period ($T_{Task1}$) by toggling the value of index 1. In the example above, once all of the new parameter values have been updated in the second page 334-B, the actual switching frequency may be changed. At this instant, the roles of the two pages will be reversed.

To explain further, during fast-rate task processing, the fast-rate task processor 340, sets and toggles a pointer at the intermediate-rate task processing rate to alternately point at the first page 334-A and the second page 334-B of the first double-buffer 334. The pointer tells applicable control algorithms which one of the pages 334-A, 334-B are to be used in the applicable control algorithms, and which one of the pages 334-A, 334-B are to be updated for future use. Hence, one set of the parameter value held at one page will be used by the fast-rate task processor 340 in the actual control algorithms or functions, while the parameter values stored at the other page can be re-initialized by the parameter re-initialization module 324 as a function of the new instantaneous switching frequency ($f_{SW\_new}$) that was computed by the computation module 322.

So for one intermediate-rate task processing period ($T_{Task1}$), the index 1 points to one page, and then it points to the other page in the following intermediate-rate task processing period ($T_{Task1}$). In the example above, the motor control algorithms will now utilize the contents of the second page 334-B, while the intermediate rate task processor can update the first page 334-A based upon a new switching frequency. Thus, the role of the first page 334-A and the second page 334-B is reversed each time the switching frequency is changed.

Operation of Double-Buffers

Figure 3C:
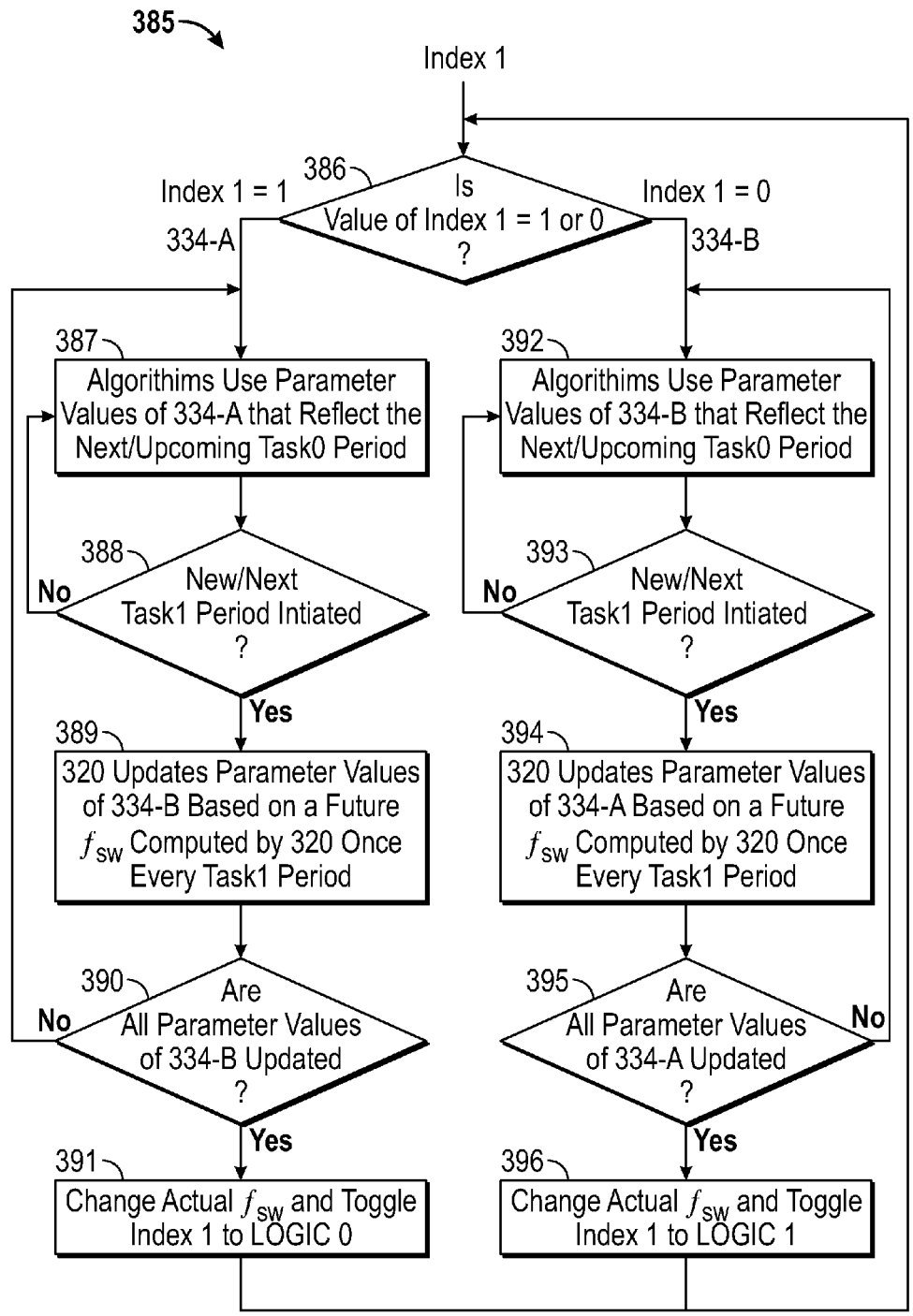
FIG. 3C is a flow chart that illustrates a method of operating a first double-buffer of FIG. 3A in accordance with one implementation of the disclosed embodiments.

FIG. 3C is a flow chart that illustrates a method 385 of operation for the first double-buffer 334 in accordance with one implementation of the disclosed embodiments. FIG. 3C will be described with reference to FIGS. 3A and 3B.

At step 386, the intermediate-rate task processor module 320 determines whether the value of index 1 is logical one or logical zero.

When the value of index 1 is logical one (1), the method proceeds to step 387, and the motor control algorithms use parameter values stored in the first page 334-A (of the first double-buffer 334) that reflect the next/upcoming fast-rate task processing period ($T_{Task0}$).

At step 388, the intermediate-rate task processor module 320 determines whether a new/next intermediate-rate task processing period ($T_{Task1}$) has been initiated.

When the intermediate-rate task processor module 320 determines that a new or next intermediate-rate task processing period ($T_{Task1}$) has not yet been initiated, the method 385 loops back to step 387.

When the intermediate-rate task processor module 320 determines that a new or next intermediate-rate task processing period ($T_{Task1}$) has been initiated, the method 385 proceeds to step 389. At step 389, the intermediate-rate task processor module 320 updates parameter values stored in the second page 334-B based on a new (e.g., upcoming/future) switching frequency ($f_{SW\_new}$) that is computed by the intermediate-rate task processor module 320 once every intermediate-rate task processing period ($T_{Task1}$).

At step 390, the intermediate-rate task processor module 320 determines whether all parameter values stored in the second page 334-B have been updated. When the intermediate-rate task processor module 320 determines that all parameter values stored in the second page 334-B have not yet been updated, the method 385 loops back to step 387.

When the intermediate-rate task processor module 320 determines that all parameter values stored in the second page 334-B have been updated, the method 385 proceeds to step 391. At step 391, the fast-rate task processor module 340 changes the (actual/current) switching frequency ($f_{SW}$) to the new switching frequency ($f_{SW\_new}$), toggles index 1 to logic zero (0), and the method 385 then loops back to step 386 at which point the index 1 will be switched to logic zero (0). Toggling index 1 to logic zero (0) reverses the roles of the first page 334-A and the second page 334-B so that the control algorithms will use parameter values of second page 334-B and update parameter values of the first page 334-A based on the new switching frequency ($f_{SW\_new}$).

When the method 386 loops back to step 386, the intermediate-rate task processor module 320 again determines whether the value of index 1 is logical one or logical zero.

In this iteration, the value of index 1 is logical zero (0), and the method 385 proceeds to step 392, where the motor control algorithms use parameter values stored in the second page 334-B (of the first double-buffer 334) that reflect the next/upcoming fast-rate task processing period ($T_{Task0}$).

At step 393, the intermediate-rate task processor module 320 determines whether a new/next intermediate-rate task processing period ($T_{Task1}$) has been initiated.

When the intermediate-rate task processor module 320 determines that a new/next intermediate-rate task processing period ($T_{Task1}$) has not yet been initiated, the method 385 loops back to step 392.

When the intermediate-rate task processor module 320 determines that a new/next intermediate-rate task processing period ($T_{Task1}$) has been initiated, the method 385 proceeds to step 394. At step 394, the intermediate-rate task processor module 320 updates parameter values stored in the first page 334-A based on a new switching frequency ($f_{SW\_new}$) that is computed by the intermediate-rate task processor module 320 once every intermediate-rate task processing period ($T_{Task1}$).

At step 395, the intermediate-rate task processor module 320 determines whether all parameter values stored in the first page 334-A have been updated. When the intermediate-rate task processor module 320 determines that all parameter values stored in the first page 334-A have not yet been updated, the method 385 loops back to step 392.

When the intermediate-rate task processor module 320 determines that all parameter values stored in the first page 334-A have been updated, the method 385 proceeds to step 396. At step 396, the fast-rate task processor module 340 changes the (actual/current) switching frequency ($f_{SW}$) to another new switching frequency ($f_{SW\_new}$), toggles index 1 to logic one (1), and the method 385 then loops back to step 386 at which point the index 1 will be switched to logic one (1). Toggling index 1 to logic one (1) reverses the roles of the second page 334-B and the first page 334-A so that the control algorithms will use parameter values of first page 334-A and update parameter values of the second page 334-B based on the next new switching frequency ($f_{SW\_new}$).

The processing logic used to implement the double-buffers 334/336 can be implemented in numerous different ways depending on the specific implementation.

For example, in one implementation, an exclusive OR (XOR) operator can be used as shown in Table 1, which shows a bitwise exclusive OR (XOR) operator with fixed value for Input B.

TABLE 1

| Input A | Input B | Exclusive OR (A^B) |
|---------|---------|--------------------|
| 0 | 1 | 1 |
| 1 | 1 | 0 |

As known to those skilled in the art and as shown in Table 1, the bitwise exclusive OR of an input A with a fixed input B equal to 1 essentially acts to invert the input A.

In one exemplary implementation, the double buffers 334/336 can be implemented in software using C language. In C language, the arrays are referenced starting at element 0. For a two element array, the index into the array can be either 0 or 1, depending upon which element is to be accessed. Controls functions consuming the parameter value would access the page pointed to by index 1, and the re-initialization can be performed on other page. For example, in one implementation at a particular instant, some of the control algorithm calculations, such as dead-time compensation, might access the parameter value(s) pointed to in the first page 334-A of buffer 334, while the parameter value(s) stored in the second page 334-B of buffer 334 that are not being used can be re-initialized with parameter values for the next switching period when they become available by using XOR (index 1) as the index.

PWM Voltage Advance Computation

The optional PWM voltage advance computation module 326 computes tri-state values for a PWM voltage advance delay time, as will be described below with reference to FIGS. 6B and 6C. These tri-state values will be referred to below as an initial steady-state value for the PWM voltage advance delay time ($t_{PWM\_Adv\_initial\_ss}$), an intermediate value for the PWM voltage advance delay time ($t_{PWM\_Adv\_intermediate}$), and a final steady-state value for the PWM voltage advance delay time ($t_{PWM\_Adv\_final\_ss}$). These tri-state values are used during a single switching frequency ($f_{SW}$) transition. To account for the tri-state behavior, a double buffer may be employed, and the buffer contents are updated twice per switching frequency ($f_{SW}$) transition.

A first update occurs when the PWM voltage advance computation module 326 provides the intermediate value for the PWM voltage advance delay time ($t_{PWM\_Adv\_intermediate}$) to the first double-buffer 334 for storage in a new element at the first double-buffer 334. The PWM voltage advance computation module 326 computes a final steady-state value for the PWM voltage advance delay time ($t_{PWM\_Adv\_intermediate}$), and stores it in a temporary variable. Using the normal double buffer process, the intermediate value for the PWM voltage advance delay time ($t_{PWM\_Adv\_intermediate}$) will be consumed from the first double-buffer 334 when the first index (index 1) is toggled at 354.

A second update occurs during post-fast-rate task processing, when the PWM voltage advance update module 376 overwrites the contents of the first double-buffer 334 with the final steady-state value for the PWM voltage advance delay time ($t_{PWM\_Adv\_final\_ss}$) that is stored in the temporary variable. The PWM voltage advance will be described in greater detail below with reference to FIGS. 5 and 6A-6C.

The flag variable is used to synchronize the update of new switching frequency between the intermediate-rate task processing period ($T_{Task1}$) and fast-rate task processing period ($T_{Task0}$). The flag variable control module 328 of the intermediate-rate task processor module 320 sets the flag to TRUE when all necessary intermediate-rate task computations are ready, and the fast-rate task processor module 340 sets the Flag to False when 374 of the fast-rate task processor module 340 has updated the actual switching frequency. The flag variable control module 328 sets a flag variable to True and passes this to the fast-rate task processor module 340. The actual frequency at which the inverter operates is set at the rate (that corresponds to the fast-rate task processing period ($T_{TASK0}$)) of the fast-rate task processing. To accomplish this (after the intermediate-rate task processor module 320 computes the new instantaneous switching frequency ($f_{SW\_new}$)), the intermediate-rate task processor module 320 sets a flag variable to "true." Setting the flag variable to true indicates to the fast-rate task processor 340 that the new instantaneous switching frequency ($f_{SW\_new}$) is ready to be used/implemented at the fast-rate task processor 340 during fast-rate task processing. When fast-rate task processor 340 determines that the flag variable is set to true, it can toggle the first and second indexes (e.g., index 1 is toggled in PreTask0 and index 2 is toggled in PostTask0) to change the pointer to the buffers 334, 336, change the actual switching frequency ($f_{SW}$) to the new instantaneous switching frequency ($f_{SW\_new}$), and continue its normal calculations (at the other task 0 functions module 360).

The module 329 can perform or compute other intermediate-rate task processing functions, such as, torque command processing, current command generation, field weakening, system moding, etc. After all of the intermediate-rate task processing functions are completed at module 329, the intermediate-rate task processor module 320 waits for a signal that a next scheduled iteration intermediate-rate task processing is to be performed, and upon receiving it, performs a next scheduled iteration of the intermediate-rate task processing.

The fast-rate task processing is performed or executed at the fast-rate task processor module 340 in three different stages at a pre-fast-rate task processor module 350, a fast-rate task control module 360, and a post-fast-rate task processor module 370.

The pre-fast-rate task processor module 350 performs pre-fast-rate task processing functions. The pre-fast-rate task processor module 350 checks the value of the flag variable at 352. When the flag variable is set to false, there are no further pre-fast-rate task processing functions to be performed.

By contrast, when the flag variable is set to true, pre-fast-rate task processor module 350 toggles the first index (index 1) at block 354 to change a pointer to the double buffer 334 so that the pointer points to the opposite page that it was previously pointing to. The first double-buffer 334 includes the future parameter values that are to be used in control calculations that need to use a next (upcoming) period (that is determined by the instantaneous switching frequency ($f_{SW\_new}$)). To explain further, some control calculations or functions, such as dead-time compensation or duty cycle clamping, need to perform their fast-rate task processing computations using future parameter values for the next or "upcoming" PWM period that will be applied in the next sample period. These parameter values are stored in the first double-buffer 334. As such, the index 1 for these parameter values is toggled of the pre-fast-rate task processing, prior to performing the calculations which consume these parameter values. As such, the first index (index 1) is toggled in pre-fast-rate task processing to select future parameter values stored in the first double-buffer 334 that are to be used in control calculations that need to use the next/upcoming PWM period. At block 356, the pre-fast-rate task processor module 350 generates a frequency change command to change the operating frequency ($f_{SW}$) to the instantaneous switching frequency ($f_{SW\_new}$) that was computed at block 322. This frequency change command will not take effect until the subsequent PWM period.

After the processing for pre-fast-rate task processing is completed, the fast-rate task control module 360 performs other fast-rate task processing functions that are used to set up the parameters for the following PWM period. The other fast-rate task processing functions are usually associated with vector control algorithms and can include, for example, functions such as Clarke/Park transformations, synchronous frame current regulation, inverse transformations, PWM duty cycle calculations, diagnostic checks, etc. As will be explained below, the parameter values computed by the fast-rate task control module 360 in the other fast-rate task processing functions are not implemented in the inverter until a subsequent PWM period.

The post-fast-rate task processor module 370 performs post-fast-rate task processing functions. At module 372, the post-fast-rate task processor module 370 checks the value of the flag variable. When the flag variable is false, no post-fast-rate task processing functions are performed. By contrast, when the flag variable is true, then at module 374, post-fast-rate task processor module 370 updates the switching frequency ($f_{SW}$) parameter with the new instantaneous switching frequency ($f_{SW\_new}$). For some calculations that directly access the switching frequency ($f_{SW}$) parameter, the value should reflect the PWM period for the current PWM cycle.

In some embodiments, at optional module 376, the post-fast-rate task processor module 370 updates the PWM voltage advance element that is stored in buffer 334 with a final steady-state value for the PWM voltage advance delay time ($t_{PWM\_Adv\_final\_ss}$) that has been stored in a temporary variable.

The post-fast-rate task processor module 370 then sets the flag variable to false at block 378, and then toggles the second index (index 2) to change the pointer so that it points to the updated page 336-X in buffer 336 that includes current parameter values that were calculated as a function of the new switching frequency ($f_{SW\_new}$). This way, functions that need to use the period for the current/existing PWM cycle can select elements stored at page 336-X of the double buffer 336 so that parameter values corresponding to the current/existing PWM period are used in any relevant control calculations. Some examples of such functions may be low pass filters, current regulator gains, current predictors, etc.

After all of the fast-rate task processing functions are completed, the post-fast-rate task processor module 370 then waits until it is time to perform or execute the next fast-rate task processing iteration, at which point, the fast-rate task processor module 340 loops back to the pre-fast-rate task processor module 350.

Operational details of the software architecture 300 will now be described below with reference to FIGS. 4, 5 and 6A-6C.

Figure 4:
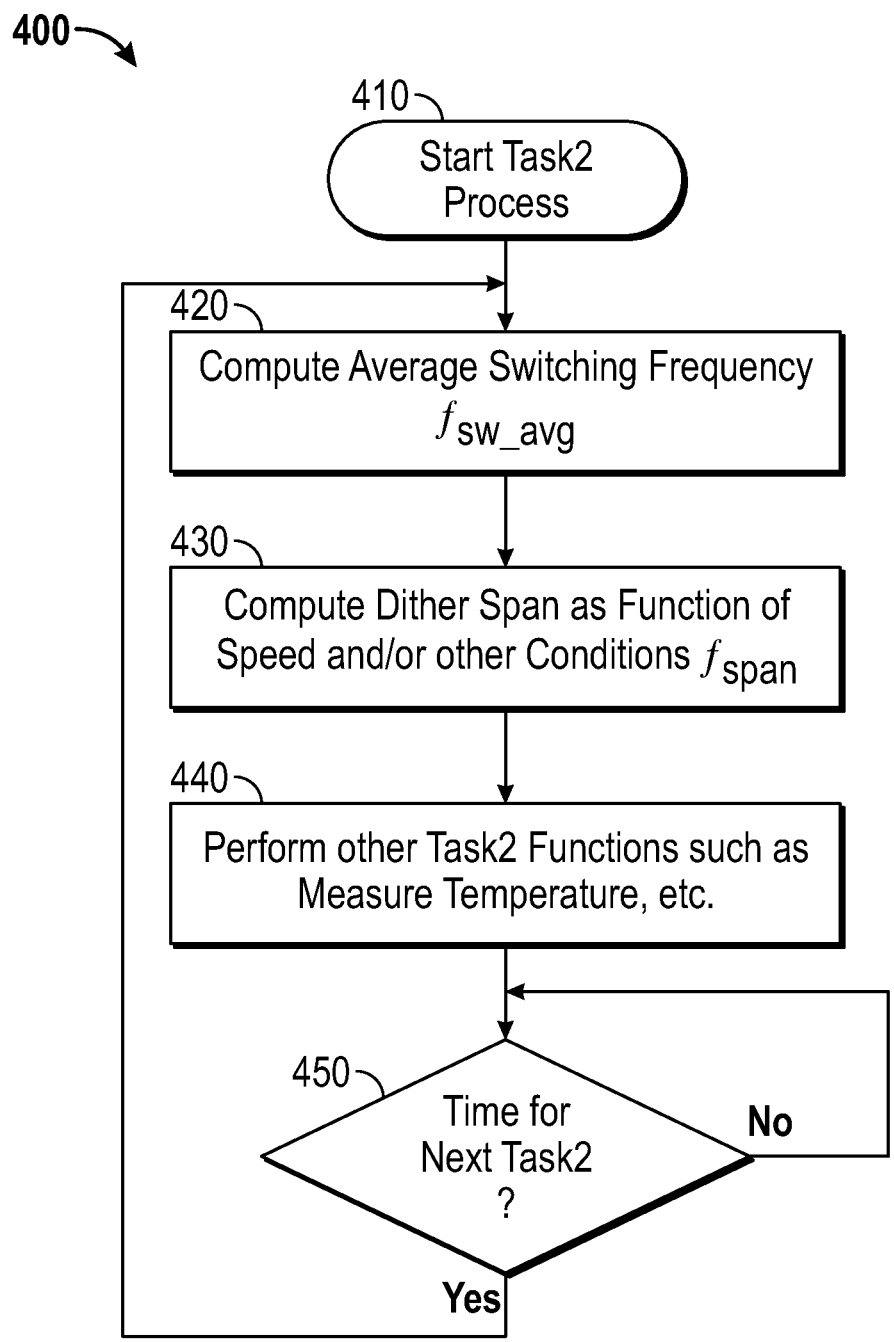
FIG. 4 is a flow chart that illustrates slow-rate task processing in accordance with some of the disclosed embodiments.

FIG. 4 is a flow chart that illustrates slow-rate task processing 400 in accordance with some of the disclosed embodiments. The slow-rate task processing functions that are performed or executed at a relatively slow rate or frequency.

The slow-rate task processing starts at 410, and at 420, the slow-rate task processor module 310 computes the average switching frequency ($f_{SW\_avg}$). The average switching frequency ($f_{SW\_avg}$) of the inverter does not change very rapidly and can therefore be computed at 420 of FIG. 4 in the slow-rate task processing loop. The average switching frequency ($f_{SW\_avg}$) may be computed as a function of several parameters and current operating conditions that can vary depending on the implementation such as motor speed, load torque, inverter temperature, etc.

At 430, the slow-rate task processor module 310 computes a dither span frequency ($f_{span}$), which corresponds to the amount of frequency variation allowed. The dither span frequency ($f_{span}$) can be computed, for example, as a function of motor speed and/or other operating conditions.

At 440, other slow-rate functions can be performed or computed. The other slow-rate functions can include, for example, temperature measurement, filtering of slowly changing signals, etc.

After all of the slow-rate functions have been performed at 440, the slow-rate task processing 400 proceeds to 450, where the slow-rate task processor module 310 waits for a next scheduled iteration of the slow-rate task processing.

Figure 5:
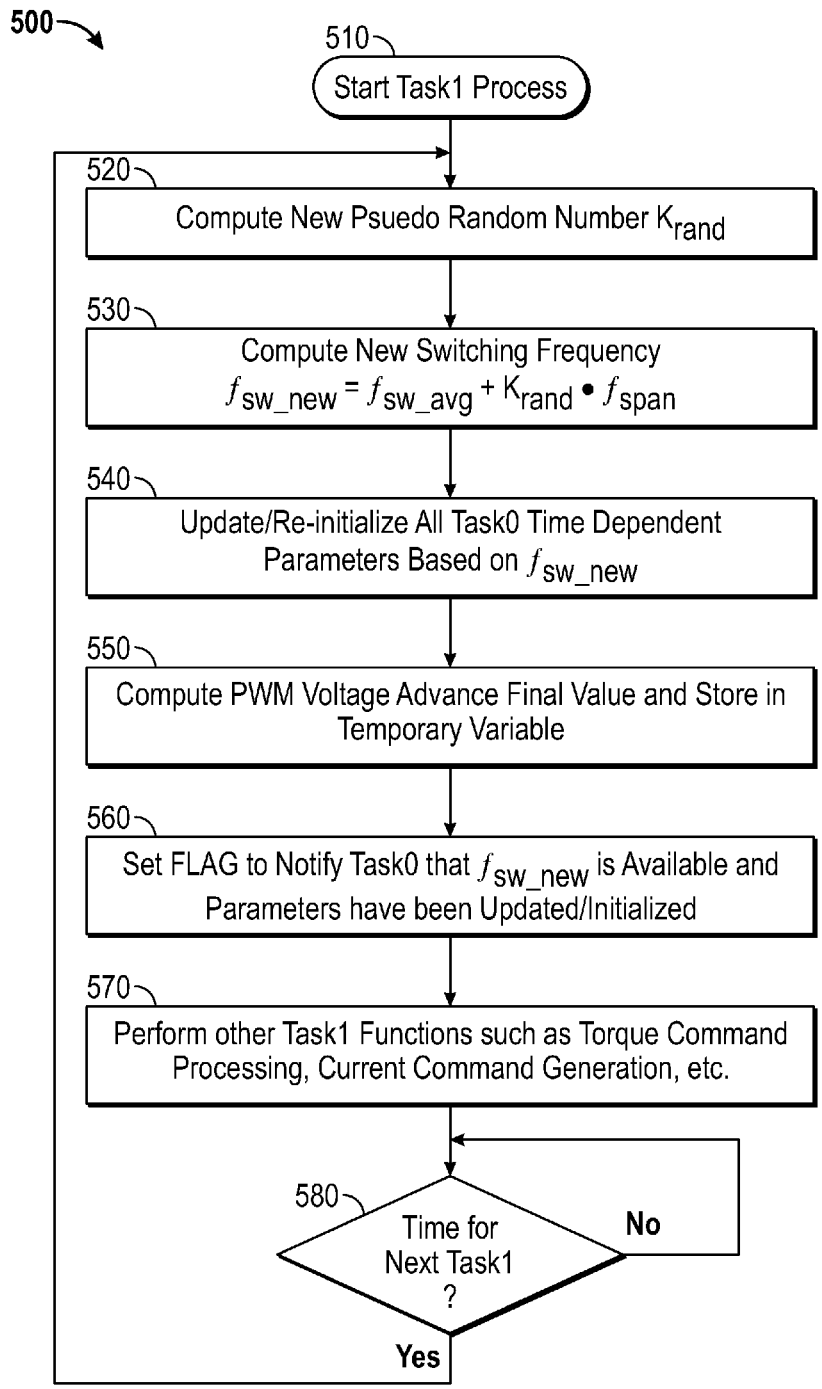
FIG. 5 is a flow chart that illustrates intermediate-rate task processing in accordance with some of the disclosed embodiments

FIG. 5 is a flow chart that illustrates intermediate-rate task processing 500 in accordance with some of the disclosed embodiments. The intermediate-rate task processing functions are performed or executed at an intermediate rate or frequency.

The intermediate-rate task processing 500 begins at 510, and at 520, the computation module 322 of the intermediate-rate task processor module 320 computes a pseudo-random number ($K_{rand}$) using any known method. The pseudo-random number ($K_{rand}$) computed at 530 is scaled or normalized to fall within the range of −0.5 to +0.5.

For the dithering to be effective, the instantaneous switching frequency ($f_{SW\_new}$) should be updated at a fairly rapid rate. For this reason, at 530 of FIG. 5, the computation module 322 computes the instantaneous switching frequency ($f_{SW\_new}$) during intermediate-rate task processing 500 at the intermediate rate. Thus, in one embodiment, the dither rate ($f_{rate}$) is the same rate as that of the intermediate-rate task processing 500. In one embodiment, the intermediate-rate task processor module 320 computes a new instantaneous switching frequency ($f_{SW\_new}$) at 530 of FIG. 5 per equation (1) that is described above using the average switching frequency ($f_{SW\_avg}$) that was computed at 420 of slow-rate task processing) 400, the dither span frequency ($f_{span}$) that was computed at 430 of slow-rate task processing) 400, and the pseudo-random number ($K_{rand}$) that was computed at 520 of the intermediate-rate task processing 500.

Parameter Re-initialization

Some types of parameters used in the motor control calculations are a function of the switching frequency ($f_{SW}$) or sample rate (i.e., the fast-rate task processing period). If the switching frequency ($f_{SW}$) is changing dynamically during operation, then these parameters need to be updated when the inverter switching frequency ($f_{SW}$) changes to reflect the actual switching frequency ($f_{SW}$). For example, intermediate-rate task processing may be interrupted by fast-rate task processing 600 many times as fast-rate task processing 600 is typically at a much higher frequency than intermediate-rate task processing 500 (by definition). As such, there is the possibility that fast-rate task processing 600 will interrupt intermediate-rate task processing 500 during the middle of parameter re-initialization calculations during the intermediate-rate task processing 500. Hence, it is possible that none, some, or all of the time dependent parameters used during fast-rate task processing 600 have not been updated with the correct value representative of the actual switching frequency ($f_{SW}$). Failure to update these types of parameters to reflect the actual switching frequency ($f_{SW}$) will result in incorrect control.

As such, at 540 of the intermediate-rate task processing 500, the intermediate-rate task processor module 320 re-initializes all time dependent parameter values of the fast-rate task processing using the new instantaneous switching frequency ($f_{SW\_new}$) computed at 530. All of the re-initializations can be performed consecutively (at 540) in the intermediate-rate task processing 500 just prior to setting a flag variable (at 560) to change over to the new switching frequency ($f_{SW}$) (as opposed to the re-initializations being performed at different times dispersed around the intermediate-rate task processing 500 calculations). Performing all of the re-initializations consecutively at 540 can help reduce the chance that time dependent parameters used during fast-rate task processing 600 will not have been updated with the correct value representative of the actual switching frequency ($f_{SW}$). While performing all of the re-initializations consecutively at 540 does not completely eliminate the possibility of some mismatch between parameter value and actual switching frequency ($f_{SW}$), it does mitigate the problem to a large degree. Parameters which are not extremely sensitive to errors in the switching frequency ($f_{SW}$) can be re-initialized during one step and handled in this simple manner.

By contrast, for some time dependent parameters that are more sensitive to errors in the switching frequency ($f_{SW}$), which are referred to above as critical or sensitive parameters, optional double-buffer 334/336 can be used, as described above, to help ensure correct alignment of the parameter value with the actual switching frequency ($f_{SW}$).

At 550, the intermediate-rate task processor module 320 computes a final steady-state value for the PWM voltage advance delay time ($t_{PWM\_Adv\_final\_ss}$) that can be stored in a temporary variable, as will be described below with reference to FIGS. 6B and 6C.

The actual frequency at which the inverter operates is set at the rate of the fast-rate task processing 600. To accomplish this (after the new instantaneous switching frequency ($f_{SW\_new}$) has been computed (at 530)), at 560 of the intermediate-rate task processing, the intermediate-rate task processor module 320 sets a flag variable to "true." Setting the flag variable to true signals the fast-rate task processing 600 to indicate that the new switching frequency ($f_{SW\_new}$) (computed at 530) is ready to be used/implemented during fast-rate task processing 600. As will be described below with reference to FIG. 6A, when fast-rate task processing 600 determines that the flag variable is set to true at 612, it can toggle the first and second indexes (index 1 and index 2) to change the respective pointers to the double-buffers 334, 336, at 614 or 640 of FIG. 6, change the actual switching frequency ($f_{SW}$) at 616 of FIG. 6, and continue its normal calculations at 620.

At 570, the intermediate-rate task processor module 320 performs any other intermediate-rate task processing functions, such as, torque command processing, current command generation, field weakening, system moding, etc.

After all of the intermediate-rate task processing functions are completed at 580, the intermediate-rate task processor module 320 waits for a signal that a next scheduled iteration intermediate-rate task processing is to be performed. When the intermediate-rate task processor module 320 receives a signal that it is time to perform a next scheduled iteration of the intermediate-rate task processing, it loops back to 520.

Figure 6A:
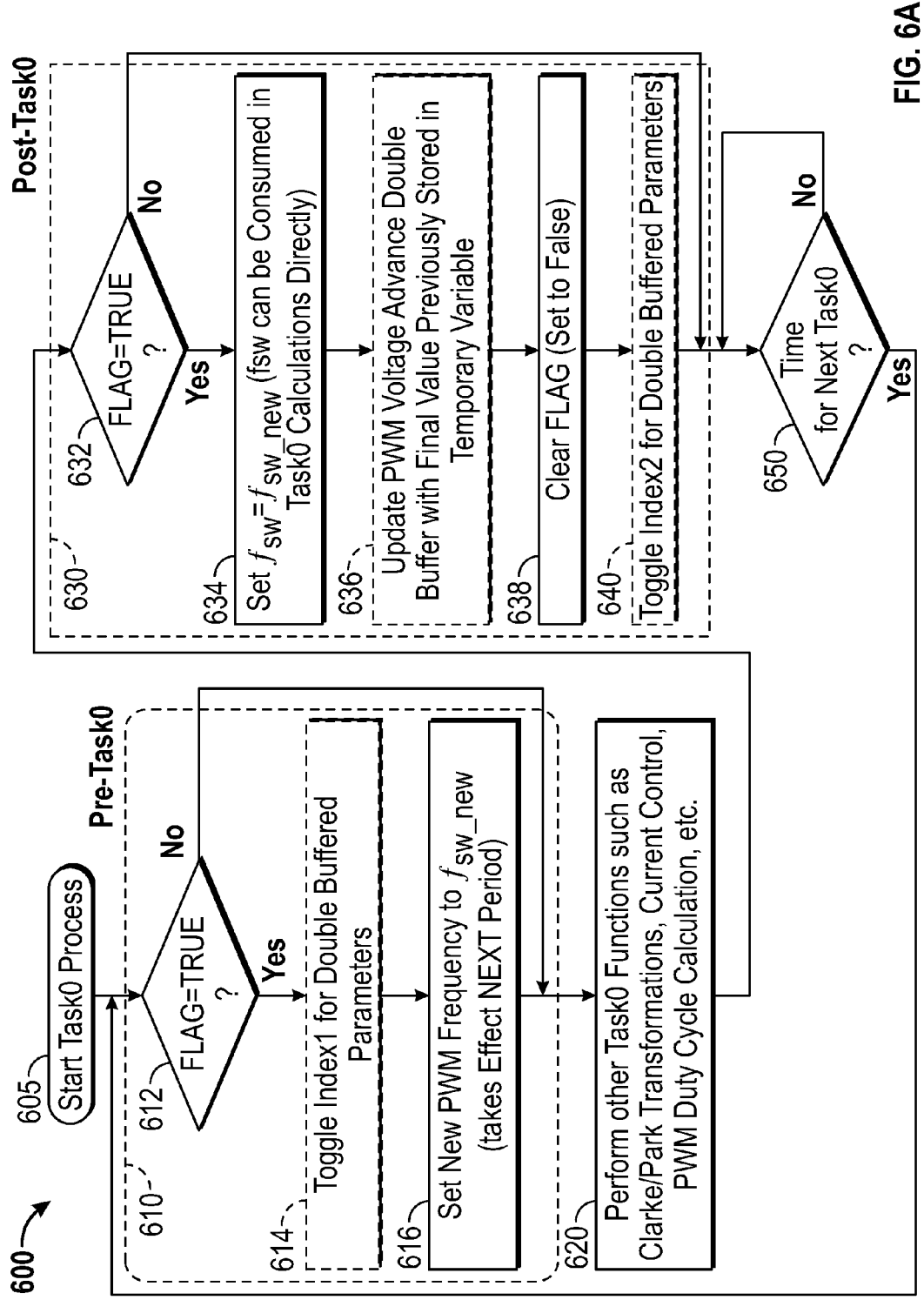
FIG. 6A is a flow chart that illustrates fast-rate task processing in accordance with some of the disclosed embodiments.

FIG. 6A is a flow chart that illustrates fast-rate task processing 600 in accordance with some of the disclosed embodiments. The fast-rate task processing functions are performed or executed at a fast rate or frequency.

The fast-rate task processing starts at 605. In FIG. 6A, block 610 illustrates pre-fast-rate task processing functions performed by the fast-rate task processor module 340, and block 630 illustrates post-fast-rate task processing functions performed by the fast-rate task processor module 340.

At 612, the fast-rate task processor module 340 checks the value of the flag variable. When the flag variable is FALSE, there are no further pre-fast-rate task processing functions, and the fast-rate task processor module 340 can proceed directly to 620.

By contrast, when the flag variable is true, then at 614, the fast-rate task processor module 340 toggles the first index (index 1) as described above to change the pointer to the first double-buffer 334. Toggling using the first index (index 1) at 614 causes the pointer to points to the most recently updated page of first double-buffer 334, which includes the future parameter values that are to be used in control calculations that need to use a next upcoming instantaneous switching frequency ($f_{SW\_new}$) that was computed at 530.

To explain further, some control calculations or functions, such as dead-time compensation or duty cycle clamping, need to perform their fast-rate task processing 600 computations using future parameter values for the next or "upcoming" PWM period that will be applied in the next sample period. These parameter values are stored in the first double-buffer 334. As such, the index 1 for these parameter values is toggled at 614 of the pre-fast-rate task processing 600, prior to performing the calculations which consume these parameter values. Thus, at 614, the first index (index 1) is toggled in pre-fast-rate task processing 610 to select future parameter values stored in the first double-buffer 334 that are to be used in control calculations that need to use the next/upcoming PWM period.

At 616, the fast-rate task processor module 340 generates the actual frequency change command to change the operating frequency ($f_{SW}$). In some implementations, this frequency change command will not take effect until the subsequent PWM period.

After the processing for pre-fast-rate task processing is completed, the fast-rate task processor module 340 proceeds to 620, where the fast-rate task processor module 340 performs other fast-rate task processing functions. These are usually associated with vector control. Functions such as Clarke/Park transformations, synchronous frame current regulation, inverse transformations, PWM duty cycle calculations, diagnostic checks, etc. may be performed at 620. These are used to set up the parameters for the following PWM period.

Block 630 illustrates post-fast-rate task processing functions.

At 632, the fast-rate task processor module 340 checks the value of the flag variable variable. When the flag variable is FALSE, there are no further post-fast-rate task processing functions, and the fast-rate task processor module 340 can proceed directly to 650.

By contrast, when the flag variable is true, then at 634, the fast-rate task processor module 340 updates the switching frequency ($f_{SW}$) parameter in software with the new instantaneous switching frequency ($f_{SW\_new}$) that was computed at 530. This is needed because some calculations in software directly access the switching frequency ($f_{SW}$) parameter. In this case, the value should reflect the PWM period for the current PWM cycle.

At 636, the fast-rate task processor module 340 updates the PWM voltage advance element that is stored in the first double-buffer 334 with a final steady-state value for the PWM voltage advance delay time ($t_{PWM\_Adv\_final\_ss}$) (that is stored in a temporary variable).

At 638, the fast-rate task processor module 340 sets the flag variable to false, awaiting the next change in switching frequency ($f_{SW}$).

At 640, the fast-rate task processor module 340 toggles the second index (index 2) as described above to change the pointer to the second double-buffer 336 that includes current parameter values that were calculated as a function of the new switching frequency ($f_{SW\_new}$). This way, functions that need to use the period for the current/existing PWM cycle can select elements stored in the second double-buffer 336 so that parameter values corresponding to the current/existing PWM period are used in any relevant control calculations. Some examples of such functions are low pass filters, current regulator gains, current predictors, etc.

After all of the fast-rate task processing functions are completed, the fast-rate task processor module 340 proceeds to 650 where it waits until it is time for the next fast-rate task processing iteration, at which point, the fast-rate task processor module 340 loops back to 612.

PWM Voltage Advance

It is well-known in the art that PWM delay should be compensated for in order to maintain stable current control at high motor speeds.

The duty cycle commands computed during fast-rate task processing 600 at 620 are not implemented in the inverter until the subsequent PWM period.

Figure 6B:
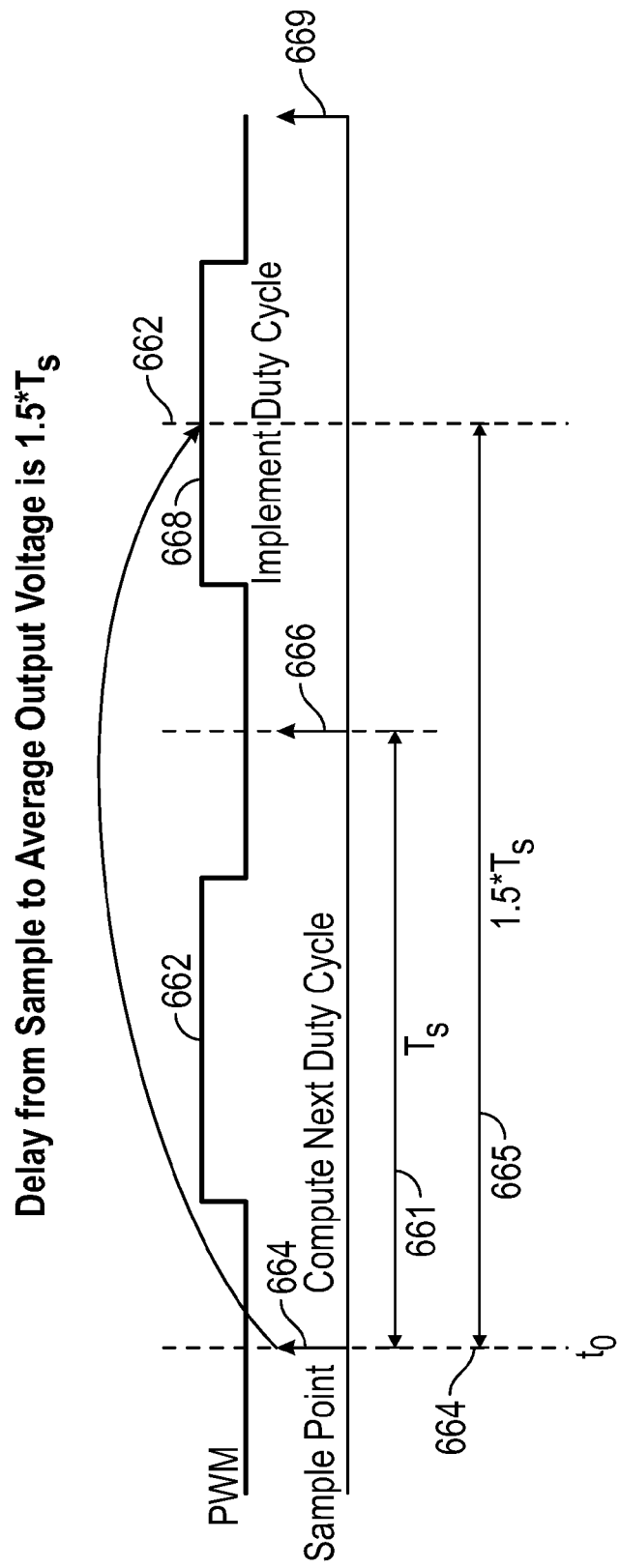
FIG. 6B is a graph that illustrates current sampling points used to calculate duty cycles of a PWM voltage signal having a period (Ts) to demonstrate the concept of PWM voltage delay time experienced in a discrete time control system and the concept of a PWM voltage advance.

FIG. 6B is a graph that illustrates current sampling points used to calculate duty cycles of a PWM voltage signal having a period (Ts) 661. FIG. 6B demonstrates the concept of PWM voltage delay time experienced in a discrete time control system and the concept of a PWM voltage advance.

The average output voltage can be considered to be in the center 662 of the PWM period. Hence, from a sample instant 664 at $t_0$, there is approximately a 1.5 $T_s$ delay 665 between the sample time 664 and the implementation of the actual voltage command at 668 (whose average is the center point 662). During this 1.5 $T_s$ delay 665, the motor will have rotated by a certain angular degree. To account for this angular rotation during the delay time 665, the angle at which the voltage command is applied is adjusted by a corresponding PWM voltage advance angle ($\Delta\theta_{PWM\_Adv}$) that can be computed as expressed in equation (2) as follows:

$$\Delta\theta_{PWM\_Adv} = t_{PWM\_Adv} * \omega_r \qquad (2)$$

The PWM voltage advance angle ($\Delta\theta_{PWM\_Adv}$) is computed based on a product of angular rotor velocity ($\omega_r$) and a value for a PWM voltage advance delay time ($t_{PWM\_Adv}$), which can have a number of different values as will be explained below. Essentially, this accounts for time difference and rotation between a current sample 664, and when the associated voltage command duty cycles (approximated by the mid-point of the following PWM period) are implemented. The compensation is implemented as an angular adjustment when performing the inverse transformations of the synchronous frame voltage commands back to the stationary reference frame, where the angle is proportional to speed times the delay time 665.

In a standard AC motor drive, where the switching frequency ($f_{SW}$) is slowly changing, it is usually adequate to compute the PWM voltage delay as 1.5 $T_s$.

However, when a dithering technique that is described above is employed and the switching frequency ($f_{SW}$) is rapidly changing by substantial amounts, a more accurate method must be used to insure current stability.

For a step change in the switching frequency ($f_{SW}$) that occurs during a switching frequency ($f_{SW}$) transition between an initial switching period ($T_{SW\_initial}$) and a next switching period ($T_{SW\_next}$), the PWM voltage advance needed to compensate for the implementation delays is given by Equation (3) as follows:

$$t_{PWM\_Adv} = T_{SW\_initial} + 1/2 T_{SW\_next} \qquad (3)$$

The PWM voltage advance delay time ($t_{PWM\_Adv}$) is a function of both the initial switching period ($T_{SW\_initial}$), which is the inverse of switching frequency during the initial switching period ($T_{SW\_initial}$), and the next switching period ($T_{SW\_next}$), which is the inverse of switching frequency to be used during the next switching period ($T_{SW\_next}$).

Thus, for any step change in switching frequency, the PWM voltage advance must go through a series of three states as follows:

- an initial steady-state value for the PWM voltage advance delay time ($t_{PWM\_Adv\_inital\_ss}$) that is computed during the initial switching period using the initial switching period ($T_{SW\_initial}$),
- an intermediate value for the PWM voltage advance delay time ($t_{PWM\_Adv\_intermediate}$) that is computed during a transition state using both the initial switching period ($T_{SW\_initial}$), and next switching period ($T_{SW\_next}$), and
- a final steady-state value for the PWM voltage advance ($t_{PWM\_Adv\_final\_ss}$) that is computed using only the next switching period ($T_{SW\_next}$).

Figure 6C:
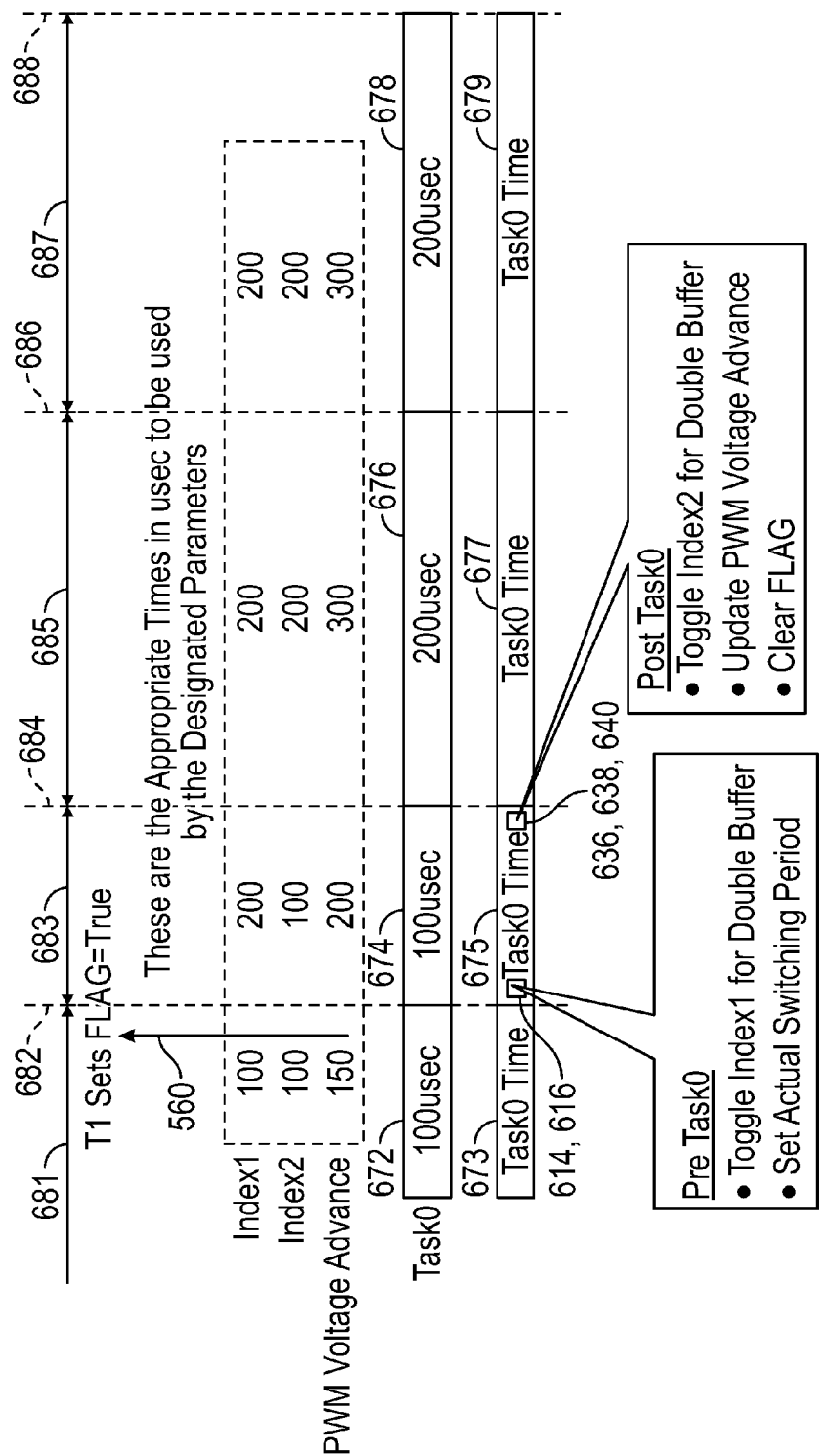
FIG. 6C illustrates an example of a step change in switching period ($T_{SW}$) and three corresponding values for a PWM voltage advance that are needed to compensate for the implementation delays during this step change.

FIG. 6C illustrates an example of a step change in switching period ($T_{SW}$) and three corresponding values for a PWM voltage advance that are needed to compensate for the implementation delays during this step change. In this particular example, it is assumed that the switching period ($T_{SW}$) is changing from 100 µs 672 during an initial switching period ($T_{SW\_initial}$) 681 to 200 µs 676 during a next switching period ($T_{SW\_next}$) 685.

During the initial switching period ($T_{SW\_initial}$) 681, the initial steady-state value for the PWM voltage advance delay time ($t_{PWM\_Adv\_inital\_ss}$) is computed as the product of 1.5 and the initial switching period ($T_{SW\_initial}$). As such, in this example, the initial steady-state value for the PWM voltage advance delay time ($t_{PWM\_Adv\_inital\_ss}$) is 150 µs (i.e., 100 µs+½*100 µs=1.5*100 µs).

During a transition state 683 that occurs during the switching frequency ($f_{SW}$) transition, an intermediate value for the PWM voltage advance delay time ($t_{PWM\_Adv\_intermediate}$) is computed using both the initial switching period ($T_{SW\_initial}$) 681, and next switching period ($T_{SW\_next}$) 685. In this example, the initial switching period ($T_{SW\_initial}$) 681 is 100 µs 672, and the next switching period ($T_{SW\_next}$) 685 is 200 µs 676, and therefore the intermediate value for the PWM voltage advance delay time ($t_{PWM\_Adv\_intermediate}$) is computed to be 200 µs (100 µs+½*200 µs).

The final steady-state value for the PWM voltage advance delay time ($t_{PWM\_Adv\_final\_ss}$) is computed using only the next switching period ($T_{SW\_next}$) 685. As described above, at 550, the final steady-state value for the PWM voltage advance delay time ($t_{PWM\_Adv\_final\_ss}$) can be stored in a temporary variable (to be retrieved during post-fast-rate task processing 600). In this example, the final steady-state value for the PWM voltage advance delay time ($t_{PWM\_Adv\_final\_ss}$) is 300 µs (200 µs+½*200 µs=1.5*200 µs).

Thus, whenever the switching frequency ($f_{SW}$) changes, it is necessary to have information regarding the three possible PWM voltage advance delay time values. Due to this tri-state nature of the PWM voltage advance delay time, the double buffer approach described previously is not adequate. To account for the tri-state behavior, a double buffer is employed, and the buffer contents are updated twice per switching frequency ($f_{SW}$) transition.

A first update occurs during intermediate-rate task processing 500, when the parameter re-initialization module 324 of the intermediate-rate task processor module 320 stores the intermediate value for the PWM voltage advance delay time ($t_{PWM\_Adv\_intermediate}$) in the first double-buffer 334.

At 550 of the intermediate-rate task processing 500, the PWM voltage advance computation module 326 of the intermediate-rate task processor module 320 computes final steady-state value for the PWM voltage advance delay time ($t_{PWM\_Adv\_final\_ss}$), and stores this in a temporary variable. Using the normal double buffer process, the intermediate value for the PWM voltage advance delay time ($t_{PWM\_Adv\_intermediate}$) will be consumed from the first double-buffer 334 by the motor control algorithm to transform the synchronous frame voltage command back to the stationary frame as soon as the first index (index 1) is toggled at 614 in pre-fast-rate task processing 610.

A second update occurs during post-fast-rate task processing 630, when the PWM voltage advance update module 376 of the fast-rate task processor module 340 overwrites the contents of the first double-buffer 334 (at 636 of FIG. 6A) with the final steady-state value for the PWM voltage advance delay time ($t_{PWM\_Adv\_final\_ss}$) that is stored in the temporary variable.

Thus, three different values for PWM voltage advance delay time (i.e., the initial steady-state value for the PWM voltage advance delay time ($t_{PWM\_Adv\_final\_ss}$), the intermediate value for the PWM voltage advance delay time ($t_{PWM\_Adv\_intermediate}$), and the final steady-state value for the PWM voltage advance delay time ($t_{PWM\_Adv\_final\_ss}$)) are used during a single switching frequency ($f_{SW}$) transition.

Figure 7A:
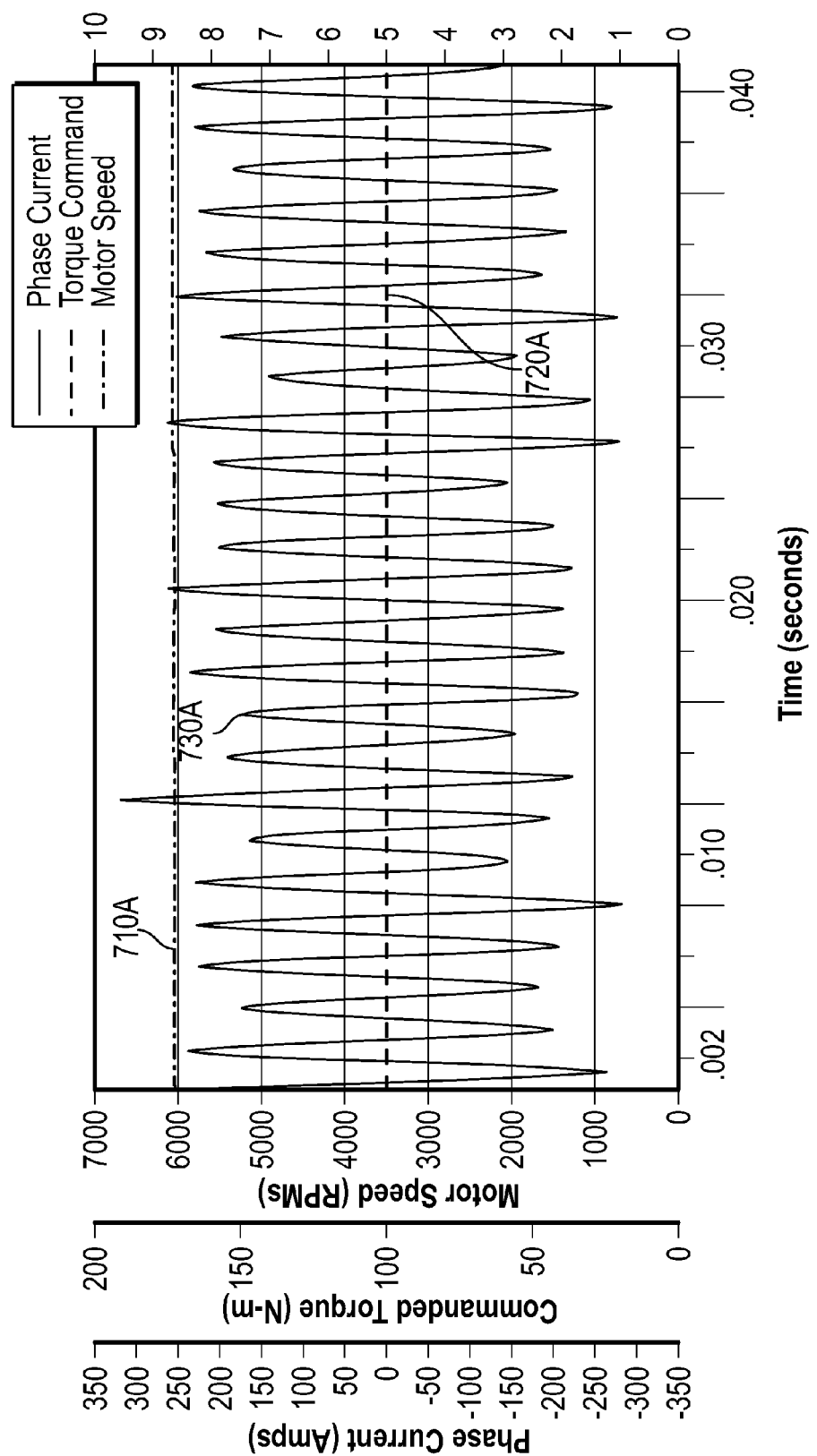
FIG. 7A is a set of graphs that show motor speed, commanded torque, and phase current of the motor when operating at relatively high motor speed using prior art AC motor control algorithms with dithering.

FIG. 7A is a set of graphs that show motor speed 710-A, commanded torque 720-A, and phase current 730-A of the motor when operating at relatively high motor speed using prior art AC motor control algorithms with dithering. FIG. 7A illustrates that the phase current 730-A is unstable and oscillatory (i.e., exhibits significant oscillation). This is due to the fact that the rapidly changing inverter frequency is not properly accounted for in the control algorithm implementation in software.

Figure 7B:
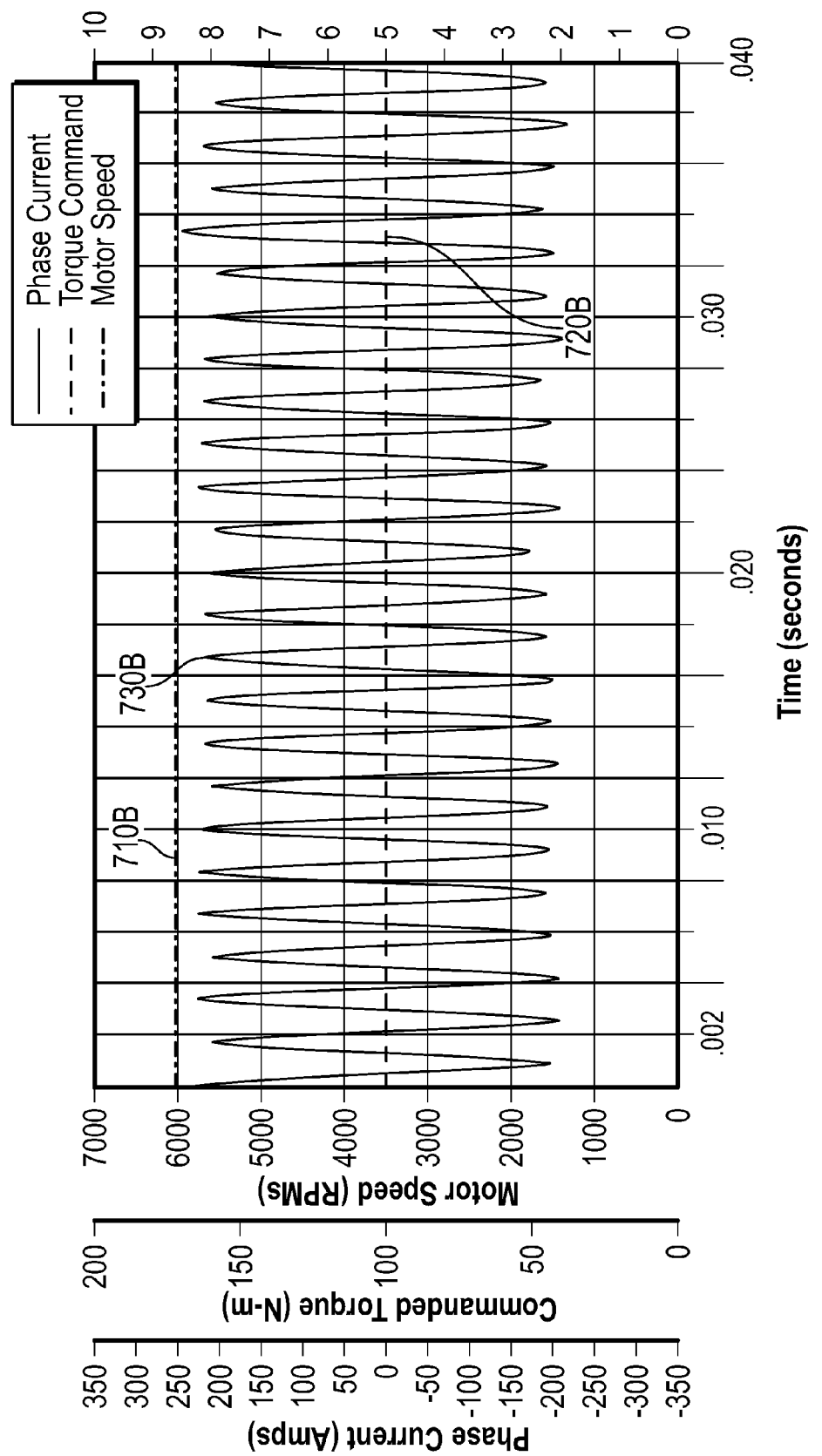
FIG. 7B is a set of graphs that show motor speed, commanded torque, and phase current of the motor when operating at relatively high motor speed using AC motor control with dithering in accordance with the disclosed embodiments.

FIG. 7B is a set of graphs that show motor speed 710-B, commanded torque 720-B, and phase current 730-B of the motor when operating at relatively high motor speed using AC motor control with dithering in accordance with the disclosed embodiments. A comparison of FIG. 7B with FIG. 7A illustrates that the phase current 730-A going to the motor exhibits significantly less oscillation (e.g., is a clean sinusoid with no observable oscillation), thus demonstrating the effectiveness of the disclosed embodiments.

CONCLUSION

Thus, various embodiments have been described for controlling operation of a multi-phase machine in a vector controlled motor drive system.

In accordance with some of the disclosed embodiments, methods, systems and apparatus are provided for double buffering any task 0 time-dependent motor control parameters when switching frequency changes so that multiple values for each of the parameters is available. This double buffering has novelty in a number of different potential applications.

In accordance with some of the disclosed embodiments, methods, systems and apparatus are provided for generating/computing a PWM voltage advance using old/current, intermediate, and future/final steady-state values any time switching frequency changes. In other words, any time the switching frequency changes, three different or tri-state values for the PWM voltage advance are used during a single switching frequency transition. In some implementations, these embodiments can implement some of the double-buffer techniques/technologies within a method for computing a PWM voltage advance. In another embodiment, a triple buffer technique can be used to compute the PWM voltage advance without using the dithering or double buffer techniques.

In accordance with some of the disclosed embodiments, methods, systems and apparatus are provided for dithering switching frequency used by PWM algorithms. Three different nested loops can be employed that execute at three different rates. For example, average switching frequency $V_{SW\_avg}$) and dither span can be computed at a slow rate (slow-rate task processing rate), and the instantaneous frequency or dither rate can be computed at a more rapid rate (intermediate-rate task processing rate). In one embodiment, the average switching frequency (which varies with relatively slowly changing system parameters such as speed, torque, temperature) is computed at a slow rate, a random number, dither value, and new switching frequency can be computed at an intermediate rate, and the actual operating frequency can be updated at fast rate. In one implementation, the disclosed dithering techniques can be used in the context of a controller in an electric motor drive to randomize constant tone acoustic noise generated by the HEV.

In some embodiments, a double-buffer can be used in conjunction with dithering. For instance, a double buffer can be used to store task 0 time dependent parameters, and can be updated at the intermediate rate. Indexes can be used to toggle between which buffer page (or the double-buffer) the actual controls are using versus which one is being updated. A flag can be set when all of the computations are completed and parameter values have been updated; this flag is used as a handshake signal to let a fast-rate task processor know that buffers have been updated and that it can change the actual switching frequency. In some embodiments, pre-task 0 and post-task 0 functions are used to toggle indexes, update PWM voltage advance post-task 0, and set the switching frequency. For task 0 time dependent parameters which were not handled via double buffer, task 1 parameter re-initialization functions can be grouped together so that they are performed in one step to minimize chance of interrupt occurring during these computations. In some implementations, two sets of double buffers can be used, depending upon whether the parameter of interest needs to use the current or future task0 period information in its computations.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

iteratively executing a slow-rate task processing loop that executes at a relatively slow-rate during a first task processing period ($T_{TASK2}$), wherein the step of iteratively executing the slow-rate task processing loop comprises:

computing, once during each first task processing period ($T_{TASK2}$), an average switching frequency ($f_{SW\_avg}$) and a dither span frequency ($f_{span}$), wherein the dither span frequency ($f_{span}$) corresponds to an amount of frequency variation allowed when dithering switching frequency ($f_{SW}$) to generate switching signals that are applied to an inverter module;

iteratively executing an intermediate-rate task processing loop that executes at an intermediate-rate during a second task processing period ($T_{TASK1}$), wherein the relatively slow-rate is less than the intermediate-rate, iteratively executing a fast-rate task processing loop that executes at a relatively fast-rate during a third task processing period ($T_{Task0}$), wherein the intermediate-rate is less than the relatively fast-rate;

wherein iteratively executing an intermediate-rate task processing loop, comprises:

computing, at the intermediate-rate ($T_{TASK1}$) during execution of intermediate-rate task processing loop: a pseudo-random number ($K_{rand}$), and a new instantaneous switching frequency ($f_{SW\_new}$) based on the average switching frequency ($f_{SW\_avg}$), the dither span frequency ($f_{span}$) and a scaled version of the pseudo-random number ($K_{rand}$); and regularly and consecutively re-initializing time-dependent parameter values used during the fast-rate task processing based on the new instantaneous switching frequency ($f_{SW\_new}$) so that all of the time-dependent parameter values used during the fast-rate task processing have been updated with correct values representative of the new instantaneous switching frequency ($f_{SW\_new}$), wherein iteratively executing the fast-rate task processing loop comprises:

executing a pre-fast-rate task processing loop of the fast-rate task processing loop, wherein the pseudo-random number ($K_{rand}$) and the new instantaneous switching frequency ($f_{SW\_new}$) are computed prior to the execution of the pre-fast-rate task processing loop; and executing a post-fast-rate task processing loop of the fast-rate task processing loop.

2. A method according to claim 1, wherein the step of iteratively executing an intermediate-rate task processing loop further comprises:

setting a flag variable to true after computing the new instantaneous switching frequency ($f_{SW\_new}$) to signal that the new instantaneous switching frequency ($f_{SW\_new}$) is ready to be used by the fast-rate task processing loop.

3. A method according to claim 2, further comprising:

configuring a first double-buffer to hold a first set of parameter values, wherein the first double-buffer comprises:

a first page comprising: a plurality of first elements, wherein each one of the first elements is configured to hold one of a first plurality of parameter values, wherein each one of the first plurality of parameter values corresponds a first value for a particular time-dependent parameter; and a second page comprising: a plurality of second elements, wherein each one of the second elements is configured to hold one of a second plurality of parameter values, wherein each one of the second plurality of parameter values corresponds to a second value for one of the particular time-dependent parameters.

4. A method according to claim 3, wherein the time-dependent parameters are used by motor control modules, and are a function of switching frequency ($f_{SW}$).

5. A method according to claim 3, wherein the step of executing the pre-fast-rate task processing loop of the fast-rate task processing loop, comprises:

toggling a value of a first index once every second task processing period ($T_{Task1}$) during pre-fast-rate task processing such that a first pointer alternately points to the first page or the second page such that the first elements of the first page and the second elements of the second page are configured, depending on the value of the first index at a particular time, to alternately hold:

new parameter values for the time-dependent parameters that are being updated for future use by motor control modules based upon the new instantaneous switching frequency ($f_{SW\_new}$), wherein the new parameter values reflect the new instantaneous switching frequency ($f_{SW\_new}$) that will be applied for the fast-rate task processing during a next third task processing period ($T_{Task0}$); or current parameter values for the time-dependent parameters that are used by the fast-rate task processing loop and used by the motor control modules at a current instant of time, wherein the current parameter values reflect the current actual instantaneous switching frequency ($f_{SW}$) that will be applied for the fast-rate task processing during a current third task processing period ($T_{Task0}$).

6. A method according to claim 5, wherein the step of iteratively executing the fast-rate task processing loop, comprises:

determining that a new intermediate-rate of the second task processing period ($T_{Task1}$) has been initiated, wherein the step of iteratively executing the intermediate-rate task processing loop further comprises:

updating the new parameter values for the time-dependent parameters based upon the new instantaneous switching frequency ($f_{SW\_new}$); and when updating of the new parameter values is complete:

wherein the step of iteratively executing the fast-rate task processing loop further comprises:

changing the current actual switching frequency to the new instantaneous switching frequency ($f_{SW\_new}$); and then toggling the value of the first index.

7. A method according to claim 3, wherein the step of executing the pre-fast-rate task processing loop of the fast-rate task processing loop, comprises:

determining if the flag variable is set to true; and when the flag variable is determined to be set to true:

toggling the value of the first index to change a first pointer to the double buffer so that the first pointer points to the opposite page that it was previously pointing to; and generating a frequency change command that goes to hardware to change the current actual switching frequency ($f_{SW}$) to the new instantaneous switching frequency ($f_{SW\_new}$).

8. A method according to claim 3, further comprising:

configuring a second double-buffer to hold a second set of parameter values for the time-dependent parameters, the second set of parameter values different than first plurality of parameter values for the time-dependent parameters, the second double-buffer comprising:
  a third page comprising: a plurality of third elements, wherein each one of the third elements is configured to hold one of a third plurality of parameter values, wherein each one of the third plurality of parameter values corresponds a first value for a particular time-dependent parameter;
  a fourth page comprising: a plurality of fourth elements, wherein each one of the fourth elements is configured to hold one of a fourth plurality of parameter values, wherein each one of the fourth plurality of parameter values corresponds to a second value for one of the particular time-dependent parameters;
  wherein the step of executing the post-fast-rate task processing loop, comprises:
    determining if the flag variable is set to true; and
    when the flag variable is determined to be set to true:
      updating a variable in software that stores the current actual switching frequency ($f_{SW}$) with the new instantaneous switching frequency ($f_{SW\_new}$) and then setting the flag variable to false; and
      toggling, after the flag variable is set to false, a value of a second index at the intermediate-rate such that a second pointer alternately points to the third page or the fourth page once every second task processing period ($T_{Task1}$).

9. A method according to claim 1, wherein fast-rate task processing is non-interruptible by the intermediate-rate task processing and the slow-rate task processing, and wherein intermediate-rate task processing is non-interruptible by the slow-rate task processing and is interruptible by the fast-rate task processing, wherein the slow-rate task processing is interruptible by the fast-rate task processing and the intermediate-rate task processing.

10. A system, comprising:
  a processor;
  a memory, coupled to the processor, the memory comprising a non-transitory processor-readable storage medium comprising a plurality of software modules executable by the processor, the plurality of software modules comprising:
    a slow-rate task processor module that is configured to iteratively execute slow-rate task processing during a slow-rate task processing loop that executes at a relatively slow-rate during a first task processing period ($T_{TASK2}$), wherein the slow-rate task processor module comprises:
      a first computation module that computes, once during each first task processing period ($T_{TASK2}$), an average switching frequency ($f_{SW\_avg}$) and a dither span frequency ($f_{span}$) that corresponds to an amount of frequency variation allowed when dithering switching frequency ($f_{SW}$);
    an intermediate-rate task processor module that is configured to iteratively execute intermediate-rate task processing during an intermediate-rate task processing loop that executes at an intermediate-rate during a second task processing period ($T_{TASK1}$), wherein the relatively slow-rate is less than the intermediate-rate; and
    a fast-rate task processor module that is configured to iteratively execute fast-rate task processing during a fast-rate task processing loop that executes at a relatively fast-rate during a third task processing period ($T_{Task0}$), wherein the intermediate-rate is less than the relatively fast-rate, and wherein the intermediate-rate task processor module, comprises:
  a second computation module that is configured to compute, at the intermediate-rate ($T_{TASK1}$) during execution of intermediate-rate task processing loop: a pseudo-random number ($K_{rand}$), and a new instantaneous switching frequency ($f_{SW\_new}$) based on the average switching frequency ($f_{SW\_avg}$), the dither span frequency ($f_{span}$) and a scaled version of the pseudo-random number ($K_{rand}$); and
  a parameter re-initialization module that regularly and consecutively re-initializes time-dependent parameter values that will be used by the fast-rate task processor, based on the new instantaneous switching frequency ($f_{SW\_new}$),
wherein the fast-rate task processing loop comprises:
  a pre-fast-rate task processor module that is configured to execute pre-fast-rate task processing during a pre-fast-rate task processing loop of the fast-rate task processing loop, wherein the second computation module is configured to compute the pseudo-random number ($K_{rand}$) and the new instantaneous switching frequency ($f_{SW\_new}$) prior to the execution of the pre-fast-rate task processing loop; and
  a post-fast-rate task processor module that is configured to execute post-fast-rate task processing during a post-fast-rate task processing loop of the fast-rate task processing loop.

11. A system according to claim 10, wherein the intermediate-rate task processor module further comprises:
  a flag variable control module that is configured to set a flag variable to true after the second computation module computes the new instantaneous switching frequency ($f_{SW\_new}$), wherein the time-dependent parameter values are re-initialized prior to setting the flag variable to true.

12. A system according to claim 11, further comprising:
  a first double-buffer that is configured to hold a first set of parameter values, comprising:
    a first page comprising: a plurality of first elements, wherein each one of the first elements is configured to hold one of a first plurality of parameter values, wherein each one of the first plurality of parameter values corresponds a first value for a particular time-dependent parameter; and
    a second page comprising: a plurality of second elements, wherein each one of the second elements is configured to hold one of a second plurality of parameter values, wherein each one of the second plurality of parameter values corresponds to a second value for one of the particular time-dependent parameters.

13. A system according to claim 12, wherein the time-dependent parameters are used by motor control modules, and wherein the time-dependent parameters are a function of switching frequency ($f_{SW}$) and sensitive to errors in the switching frequency ($f_{SW}$).

14. A system according to claim 12, wherein the fast-rate task processor module toggles a value of a first index once every second task processing period ($T_{Task1}$) during fast-rate task processing such that a first pointer alternately points to the first page or the second page, and wherein the first elements of the first page and the second elements of the second page are configured, depending on the value of the first index at a particular time, to alternately hold:
  new parameter values for the time-dependent parameters that are being updated by the parameter re-initialization module of the intermediate-rate task processor module for future use by motor control modules based upon the new instantaneous switching frequency ($f_{SW\_new}$) that was computed by the second computation module, wherein the new parameter values reflect the new instantaneous switching frequency ($f_{SW\_new}$) that will be applied for the fast-rate task processing during a next third task processing period ($T_{Task0}$); or current parameter values for the time-dependent that are used by the motor control modules at the fast-rate task processor module at a current instant of time, wherein the current parameter values reflect the current actual instantaneous switching frequency ($f_{SW}$) that will be applied for the fast-rate task processing during a current third task processing period ($T_{Task0}$).

15. A system according to claim 14, when the fast-rate task processor module determines that a new intermediate-rate of the second task processing period ($T_{Task1}$) has been initiated, wherein the intermediate-rate task processor module updates the new parameter values for the time-dependent parameters based upon the new instantaneous switching frequency ($f_{SW\_new}$) that was computed by the second computation module, and when updating of the new parameter values is complete, where the fast-rate task processor module changes the current actual switching frequency to the new instantaneous switching frequency ($f_{SW\_new}$), and then toggles the value of the first index.

16. A system according to claim 12, wherein setting the flag variable to true signals the fast-rate task processor that the new instantaneous switching frequency ($f_{SW\_new}$) is ready to be used at the fast-rate task processor during fast-rate task processing, wherein the pre-fast-rate task processor module, comprises:

a first check module that is configured to check the flag variable to determine if the flag variable is set to true; and a first toggle module that is configured to toggle, when the flag variable is determined to be set to true, the value of the first index to change a first pointer to the first double buffer so that the first pointer points to the opposite page that it was previously pointing to;

a command generation module that is configured to generate a frequency change command that goes to hardware to change the current actual switching frequency ($f_{SW}$) to the new instantaneous switching frequency ($f_{SW\_new}$) when the flag variable is determined to be set to true.

17. A system according to claim 16, wherein the first double-buffer is a first double-buffer, and further comprising:

a second double-buffer that is configured to hold a second set of parameter values different than first plurality of parameter values for the time-dependent parameters, comprising:

a third page comprising: a plurality of third elements, wherein each one of the third elements is configured to hold one of a third plurality of parameter values, wherein each one of the third plurality of parameter values corresponds a first value for a particular parameter;

a fourth page comprising: a plurality of fourth elements, wherein each one of the fourth elements is configured to hold one of a fourth plurality of parameter values, wherein each one of the fourth plurality of parameter values corresponds to a second value for one of the particular parameters, wherein the fast-rate task processor module toggles a value of a second index at the intermediate-rate during fast-rate task processing such that a second pointer alternately points to the third page or the fourth page once every second task processing period ($T_{task1}$).

18. A system according to claim 17, wherein the post-fast-rate task processor module, comprises:

a second check module that is configured to check the flag variable to determine if the flag variable is set to true; and an updating module that is configured to update, when the flag variable is determined to be set to true, a variable in software that stores the current actual switching frequency ($f_{SW}$) with the new instantaneous switching frequency ($f_{SW\_new}$);

a module that is configured to set the flag variable to false after the variable in software that stores the current actual switching frequency ($f_{SW}$) is updated with the new instantaneous switching frequency ($f_{SW\_new}$);

a second toggle module that is configured to toggle, after the flag variable is set to false, the value of the second index at the intermediate-rate during fast-rate task processing such that the second pointer alternately points to the third page or the fourth page once every second task processing period ($T_{task1}$).

19. A system according to claim 10, wherein fast-rate task processing is non-interruptible by the intermediate-rate task processing and the slow-rate task processing, and wherein intermediate-rate task processing is non-interruptible by the slow-rate task processing and is interruptible by the fast-rate task processing, and wherein the slow-rate task processing is interruptible by the fast-rate task processing and the intermediate-rate task processing.

* * * * *